United States Patent
Miyakawa et al.

(10) Patent No.: US 6,298,060 B1
(45) Date of Patent: Oct. 2, 2001

(54) LAYER 2 INTEGRATED ACCESS SCHEME

(75) Inventors: Shin Miyakawa, Palo Alto, CA (US); Satoshi Ono; Kazuyuki Terao, both of Tokyo (JP)

(73) Assignees: Nippon Telegraph and Telephone Corporation, Tokyo (JP); NTT America, Inc., New York, NY (US)

( * ) Notice: Subject to any disclaimer, the term of this patent is extended or adjusted under 35 U.S.C. 154(b) by 0 days.

(21) Appl. No.: 09/070,123

(22) Filed: Apr. 30, 1998

(51) Int. Cl.$^7$ ....................................... H04Q 7/22
(52) U.S. Cl. .................. 370/400; 370/407; 370/467; 370/469; 370/328; 455/433; 455/435; 455/436
(58) Field of Search ................... 370/328, 338, 370/352, 355, 401, 467, 469, 400; 455/433, 436, 450, 451, 452, 554, 555, 556, 557, 437, 466

(56) References Cited

U.S. PATENT DOCUMENTS

| | | | |
|---|---|---|---|
| 5,325,362 | * 6/1994 | Aziz | 370/400 |
| 5,490,139 | * 2/1996 | Baker et al. | 370/401 |
| 5,572,528 | * 11/1996 | Shuen | 370/401 |
| 5,664,007 | 9/1997 | Samadi et al. . | |
| 5,675,524 | 10/1997 | Bernard . | |
| 5,894,478 | * 4/1999 | Barzegar et al. | 370/401 |
| 5,896,369 | * 4/1999 | Warsta et al. | 455/557 |
| 5,918,019 | * 6/1999 | Valencia | 370/401 |
| 6,163,532 | * 12/2000 | Taguchi et al. | 370/338 |

OTHER PUBLICATIONS

Johnson et al., Protocols for Adaptive Wireless and Mobile Networking, IEEE, pp. 1–18, Feb. 1996.*
McGuire, Jr. et al, A Multiport Mobile Internet–Router, IEEE, pp. 14351439, Mar. 1994.*
Bhagwa et al., Network Layer Mobility: an Architecture and Survey, University of Maryland, pp. 1–22, Sep. 1995.*
European Search Report dated Oct. 5, 1999.

(List continued on next page.)

*Primary Examiner*—Wellington Chin
*Assistant Examiner*—Frank Duong
(74) *Attorney, Agent, or Firm*—Olson & Hierl, Ltd.

(57) ABSTRACT

An L2 integrated access (L2IA) system is constructed from: L2IA subscribers for supporting communications between user terminals using various communication media, each L2IA subscriber having an L2IA identifier for uniquely identifying each L2IA subscriber within the L2 integrated access system and a terminal ID for uniquely identifying each L2IA subscriber within each communication medium associated with each L2IA subscriber; and an L2IA relay network formed by relay units to be connected with the L2IA subscribers through various communication media and relaying communications between the L2IA subscribers through the L2IA relay network, each relay unit being provided in correspondence to one communication medium such that at least one relay unit is provided in correspondence to each communication medium, and each relay unit having an L2IA relay ID for uniquely identifying each relay unit within the L2IA relay network and a terminal ID for uniquely identifying each relay unit within each communication medium associated with each relay unit, and an LPR (Location and Preference Register) for registering an RLD (Registered Location Data) indicating a terminal ID of an L2IA subscriber and an L2IA relay ID of a relay unit for each potentially available communication medium in correspondence to the L2IA identifier of each L2IA subscriber, such that the relay unit relays the communications between the L2IA subscribers according to the RLDs registered in correspondence to the L2IA identifies of the L2IA subscribers.

15 Claims, 12 Drawing Sheets

OTHER PUBLICATIONS

MC$^2$ Platform: A Platform Supporting Mobile Computing Environment by Fijimaki, et al., ICCC '97, Nov. 18, 1997, pp. 239–244, XP–000753902.

Mobile Networking Through Mobile IP, by Charles E. Perkins, IEEE Internet Computing, Jan./Feb., 1998, pp. 58–69.

Microsoft and Cisco demonstrate interoperability of Layer 2 Tunneling Protocol implementations, by Sven Gorille and Layton Beard, ITWeb, May 16, 1997, pp. 1–2.

VPNs: Many markets, many standards by Dave Kosiur, PCWEEK Online, Apr. 27, 1998, pp. 1–4, XP–002114468.

* cited by examiner

FIG.5

RLD

| L2IA IDENTIFIER | Terminal ID | L2IA RELAY ID | PRIORITY LEVEL | COMMUNICATION MEDIA AVAILABILITY | COMMUNICATION MEDIUM |

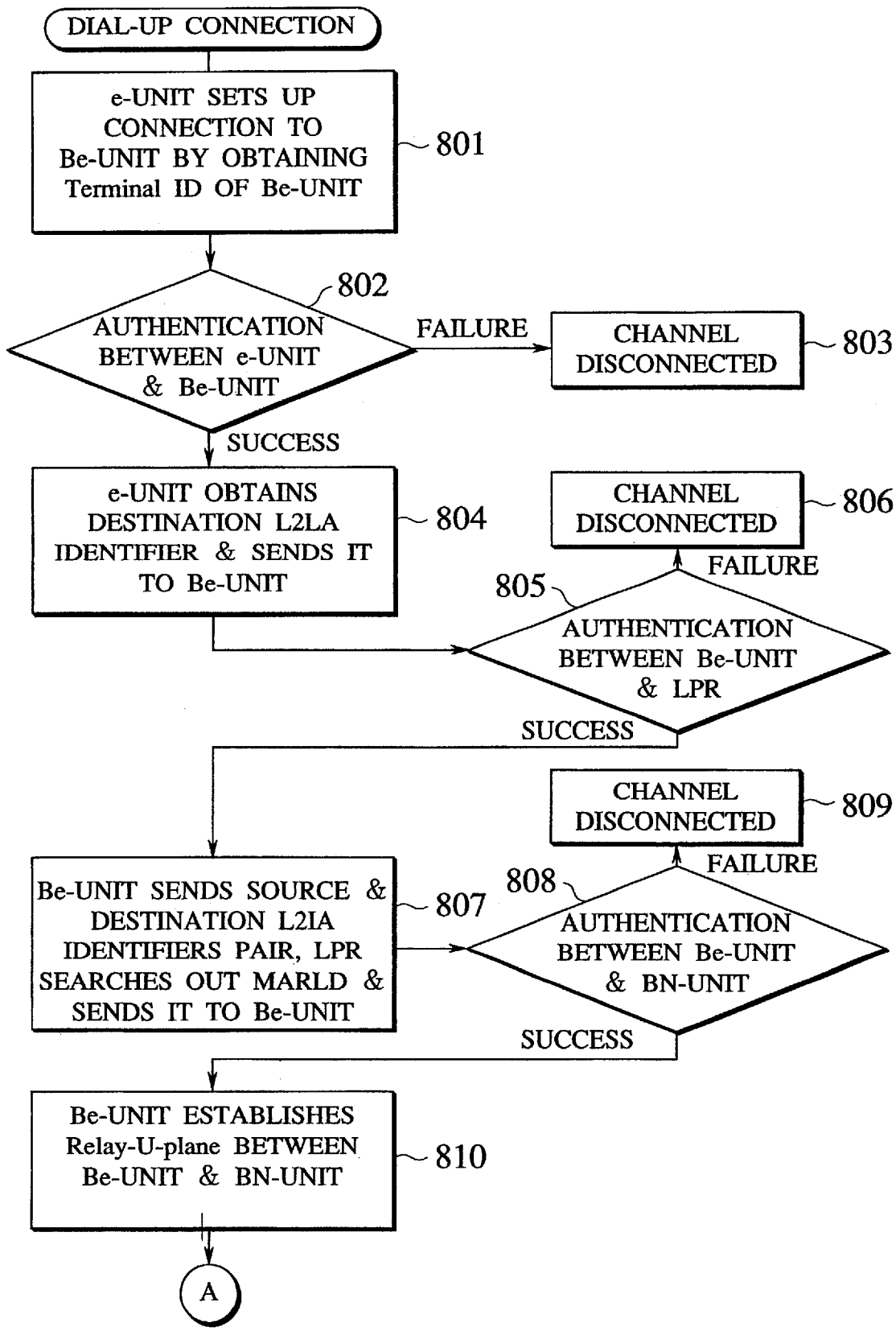

LAYER 2 INTEGRATED ACCESS SCHEME

BACKGROUND OF THE INVENTION

1. Field of the Invention

The present invention relates to a datalink (layer 2) integrated access scheme for providing a communication channel which transmits PPP (Point-to-Point Protocol) packets and PPP related information (such as login prompt, password prompt, etc.), independent of a physical channel, to realize multi-functional access to a computer network.

2. Description of the Background Art

The currently popular scheme for accessing a computer network such as Internet or Intranet from a mobile terminal is a scheme that uses a dial-up through a public network channel to set up a connection to a PPP access server. However, this conventional scheme has been associated with the problem that, when there arises a need to change communication media due to the movement of a mobile terminal during one communication session, for example, it has been either impossible to change communication media while maintaining this communication session, or necessary to rewrite program codes for changing API level in order to change communication media.

As a technique for supporting a free geographic movement by a user or a technique for eliminating dependency on communication media, there are various propositions including Mobile IP, CDPD (Cellular Digital Packet Data), L2-1 call (Seamless Network), one-number service, and Virtual LAN.

The Mobile IP supports the mobility of a mobile terminal by using two types of global IP addresses for the purpose of identifying the terminal itself on a home network of the terminal and a position of the terminal that is registered by a home agent provided on the home network, and updating an IP address for identifying a position of the terminal at a visited site as registered by the home agent whenever the terminal moves. When the terminal wishes to receive a packet destined to it at the visited site, the home agent receives that packet once and transmits it to the IP address of the terminal that is managed by the home agent by using the IP tunnelling, so that it is possible to support the mobility of the terminal and enable media exchange during communication. However, the Mobile IP is associated with the problem that it is only applicable to communication using IP, and there is a need to make changes in the IP protocol stack. In the Mobile IP, there is a need to add a stack on the IP layer in order to utilize the Mobile IP, so that there is a need to make changes in the existing application programs.

The CDPD uses a global IP address for identifying a terminal. In the CDPD network, a MD-IS (Mobile Data Intermediate System) connected with a network to which the terminal is normally connected is called a Home MD-IS and a MD-IS connected with a network to which the moved terminal is connected is called a Serving MD-IS. When the terminal moves, the terminal notifies the Serving MD-IS that it is connected to the network of the Serving MD-IS while requesting the Serving MD-IS to issue a request for position registration to the Home MD-IS. Upon receiving this request from the Serving MD-IS, the Home MD-IS of the terminal makes the position registration of the terminal by mapping the Serving MD-IS that manages the network to which the terminal is currently connected, with respect to the terminal. A packet destined to the terminal always reaches to the Home MD-IS first, and is forwarded to the Serving MD-IS from there according to the registered position registration. Upon receiving this packet, the Serving MD-IS forwards this packet to the terminal so that the terminal can receive the packet no matter where it moves.

The CDPD has a scalability for the movement of the terminal because communication is carried out by CLNP (Connection-Less Network Protocol) between MD-ISs, and in addition, has a higher safety from a viewpoint of security because the communication is carried out through networks dedicated to CDPD rather than through open IP networks such as Internet.

However, the CDPD network only supports the mobility of the terminal and cannot exchange communication media during communication. Moreover, there is a need to allocate global IP addresses statically in order to realize the dial-out service from a server side. In particular, the dial-out service from a server on the intranet which utilizes private IP addresses requires the conversion of the private addresses into global addresses so that it is difficult to realize in the CDPD. Furthermore, media that can utilize the CDPD networks are limited so that it is difficult to deal with new media.

The L2-1 call (Seamless Network) enables communication between terminals of different media by interconnecting networks of different media and enabling recognition of telephone numbers of different media by the function of networks. Here, the telephone number is used to identify the terminal so that communications can use not just IP but also various other protocols. However, it is difficult to deal with new media because it requires to incorporate a system for recognizing telephone numbers into the network, and no consideration has been given for the dial-out service (a service for sending a packet to a user side terminal by calling up from a provider side) and the media exchange during communication.

In addition, L2TP provides multi-functional access to networks but cannot realize the media exchange during communication and it is impossible to make dial-out connections to many users even when the dial-out service is contemplated.

The one-number service is a service in which a call is terminated at the center once and then connected to media registered to the center in advance by the user. Here, the telephone number is used to identify the user. In this service, the assigned telephone number indicates the geographic condition and the center to be connected is fixed so that a call path may turn out to be wasteful. For example, there can be a case where the center at Tokyo is called up from Osaka and the center at Tokyo calls up another telephone at Osaka. In this service, it is impossible to realize the media exchange during communication.

In the Virtual LAN, the terminal obtains a terminal identifier dependent on access media by sending an identifier dependent on a network protocol to be used that is given to that terminal, such as IP address for example, to a server that manages the position of that terminal, and the terminal itself directly establishes a communication path to the correspondent. In this scheme, the mobility of the terminal is supported, but it is impossible to realize the media exchange during communication. In addition, the set up of the connection to the correspondent is to be attempted by the terminal directly so that the communication path cannot be established when the respective communication media networks are not connected, and consequently it is difficult to deal with new access media.

As described, conventionally, a case where a user makes connection to a computer network such as Internet or Intranet, for example, has been mostly handled by the dial-up connection using company's network or home telephone network. However, there are remarkable advances of radio based communication media such as a portable telephone and PHS (Personal Handy Phone System), and the network access by the dial-up connection using these media is becoming wide spread. In addition, there is a considerable increase in the number of users using notebook PCs so that the support of the mobility of the terminal is becoming an important issue.

Currently, in order to change communication media to be used during communication, it is necessary to terminate a communication session by a communication application used on a computer once, and establish a communication session once again after the change of communication media.

For example, when ftp is executed by setting up a connection to a server by using the PHS first, it is difficult to continue that ftp while changing the medium to be utilized for communication from the PHS to the portable telephone without terminating that ftp session.

In a case where a server tries to set up connections to many users, if communications are carried out by using IP, it would be necessary to statically allocate as many IP addresses as the number of dial-out connection target users. In view of the current shortage of IP addresses, it is very difficult to provide the scalability to the dial-out connection. There is also a need to provide a large number of communication interfaces for use at a time of the dial-out.

In a case where a user tries to access a network, it is necessary for the user side to provide a communication device for a desired medium to be utilized by the user such as modem, adaptor for portable telephone, LAN card (Ethernet), etc., and it is also necessary for the network manager side to use communication devices for respective media. This implies that, not only the communication media that can be used by the user are going to be limited but also that there is a need for the both sides of communications to provide communication devices for respective media whenever new media are introduced so that it is difficult to deal with new media.

SUMMARY OF THE INVENTION

It is therefore an object of the present invention to provide a datalink (layer 2) integrated access scheme for providing a communication channel which transmits PPP packets and PPP related information, independent of a physical channel, which is capable of realizing multi-functional access to a computer network.

According to one aspect of the present invention there is provided an L2 integrated access system, comprising: L2IA (L2 Integrated Access) subscribers for supporting communications between user terminals using various communication media, each L2IA subscriber having an L2IA identifier for uniquely identifying each L2IA subscriber within the L2 integrated access system and a terminal ID for uniquely identifying each L2IA subscriber within each communication medium associated with each L2IA subcriber; and an L2IA relay network formed by: a plurality of relay units to be connected with the L2IA subscribers through various communication media and relaying communications between the L2IA subscribers through the L2IA relay network, each relay unit being provided in correspondence to one communication medium such that at least one relay unit is provided in correspondence to each communication medium, and each relay unit having an L2IA relay ID for uniquely identifying each relay unit within the L2IA relay network and a terminal ID for uniquely identifying each relay unit within each communication medium associated with each relay unit; and at least one LPR (Location and Preference Register) for registering an RLD (Registered Location Data) indicating a terminal ID of an L2IA subscriber and an L2IA relay ID of a relay unit for each potentially available communication medium in correspondence to the L2IA identifier of each L2IA subscriber, such that the relay unit relays the communications between the L2IA subscribers according to the RLDs registered in correspondence to the L2IA identifies of the L2IA subscribers.

According to another aspect of the present invention there is provided a method of dial-up connection from one L2IA subscriber provided at one user terminal associated with one communication medium to another L2IA subscriber provided at a user's home network associated with another communication medium in the above described L2 integrated access system, the method comprising the steps of: (a) setting up a connection from said one L2IA subscriber to one relay unit provided in correspondence to said one communication medium which is appropriate for said one L2IA subscriber; (b) specifying the L2IA identifier of said another L2IA subscriber from said one L2IA subscriber to said one relay unit; (c) setting up a connection from said one relay unit to another relay unit provided in correspondence to said another communication medium which is appropriate for said another L2IA subscriber according to one RLD registered by the LPR in correspondence to the L2IA identifier of said another L2IA subscriber specified by the step (b); and (d) setting up a connection from said another relay unit to said another L2IA subscriber according to said one RLD.

According to another aspect of the present invention there is provided a method of dial-out connection from one L2IA subscriber provided at a user's home network associated with one communication medium to another L2IA subscriber provided at one user terminal associated with another communication medium in the above described L2 integrated access system, the method comprising the steps of: (a) setting up a connection from said one L2IA subscriber to one relay unit provided in correspondence to said one communication medium which is appropriate for said one L2IA subscriber; (b) specifying the L2IA identifier of said another L2IA subscriber from said one L2IA subscriber to said one relay unit; (c) setting up a connection from said one relay unit to another relay unit provided in correspondence to said another communication medium which is appropriate for said another L2IA subscriber according to one RLD registered by the LPR in correspondence to the L2IA identifier of said another L2IA subscriber specified by the step (b); and (d) setting up a connection from said another relay unit to said another L2IA subscriber according to said one RLD.

According to another aspect of the present invention there is provided a method of handover by one L2IA subscriber provided at a user terminal which is communicating with another L2IA subscriber provided at a user's home network, for changing communication medium to be used for communication with said another L2IA subscriber from a first communication medium to a second communication medium, in the above described L2 integrated access system, the method comprising the steps of: (a) requesting the handover from said one L2IA subscriber to a first relay unit provided in correspondence to the first communication medium; (b) setting up a connection from said one L2IA subscriber to a second relay unit provided in correspondence to the second communication medium which is appropriate for said one L2IA subscriber; (c) specifying the L2IA identifier of said another L2IA subscriber from said one L2IA subscriber to the second relay unit; (d) setting up a connection from the second relay unit to a third relay unit provided in correspondence to a communication medium associated with the user's home network which is appropriate for said another L2IA subscriber according to one RLD registered by the LPR in correspondence to the L2IA identifier of said another L2IA subscriber specified by the step (c); and (e) disconnecting a connection between said one L2IA subscriber and the first relay unit as well as a connection between the first relay unit and the third relay unit.

According to another aspect of the present invention there is provided a method of handover by one L2IA subscriber provided at a user terminal which is communicating with another L2IA subscriber provided at a user's home network, for changing communication medium to be used for communication with said another L2IA subscriber from a first communication medium to a second communication medium, in the above described L2 integrated access system, the method comprising the steps of: (a) requesting the handover from said one L2IA subscriber to a first relay unit provided in correspondence to the first communication medium; (b) obtaining one RLD registered by the LPR in correspondence to the L2IA identifier of said one L2IA subscriber at the first relay unit; (c) setting up a connection to said one L2IA subscriber from a second relay unit provided in correspondence to the second communication medium which is appropriate for said one L2IA subscriber and which is indicated by said one RLD; (d) setting up a connection from the first relay unit to the second relay unit so that communication data flows from the first relay unit to said one L2IA subscriber via the second relay unit; (e) notifying the second relay unit from the first relay unit to a third relay unit provided in correspondence to a communication medium associated with the user's home network which is appropriate for said another L2IA subscriber; (f) setting up a connection between the third relay unit and the second relay unit and start transmitting the communication data from the third relay unit to the second relay unit while stop transmitting the communication data from the third relay unit to the first relay unit; and (g) disconnecting a connection between said one L2IA subscriber and the first relay unit, a connection between the first relay unit and the second relay unit, and a connection between the first relay unit and the third relay unit.

According to another aspect of the present invention there is provided a method of re-connection in the above described L2 integrated access system, comprising the steps of: (a) storing in one L2IA subscriber provided at a user's home network a communication state for a communication with another L2IA subscriber provided at a user terminal when said another L2IA subscriber interrupts the communication; and (b) resuming the communication between said one L2IA subscriber and said another L2IA subscriber from the communication state stored by the step (a), when said another L2IA subscriber carries out a re-connection to said one L2IA subscriber.

Other features and advantages of the present invention will become apparent from the following description taken in conjunction with the accompanying drawings.

BRIEF DESCRIPTION OF THE DRAWINGS

FIG. 5 is a diagram showing an exemplary form of an RLD registered by an LPR in the L2 integrated access system of FIG. 1.

FIGS. 8A and 8B are a flow chart for an exemplary signaling operation to realize a dial-up connection in the L2 integrated access system of FIG. 1.

DETAILED DESCRIPTION OF THE PREFERRED EMBODIMENTS

Referring now to FIG. 1 to FIG. 12, one embodiment of a layer 2 (L2) integrated access scheme according to the present invention will be described in detail.

Overall Configuration

Figure 1:
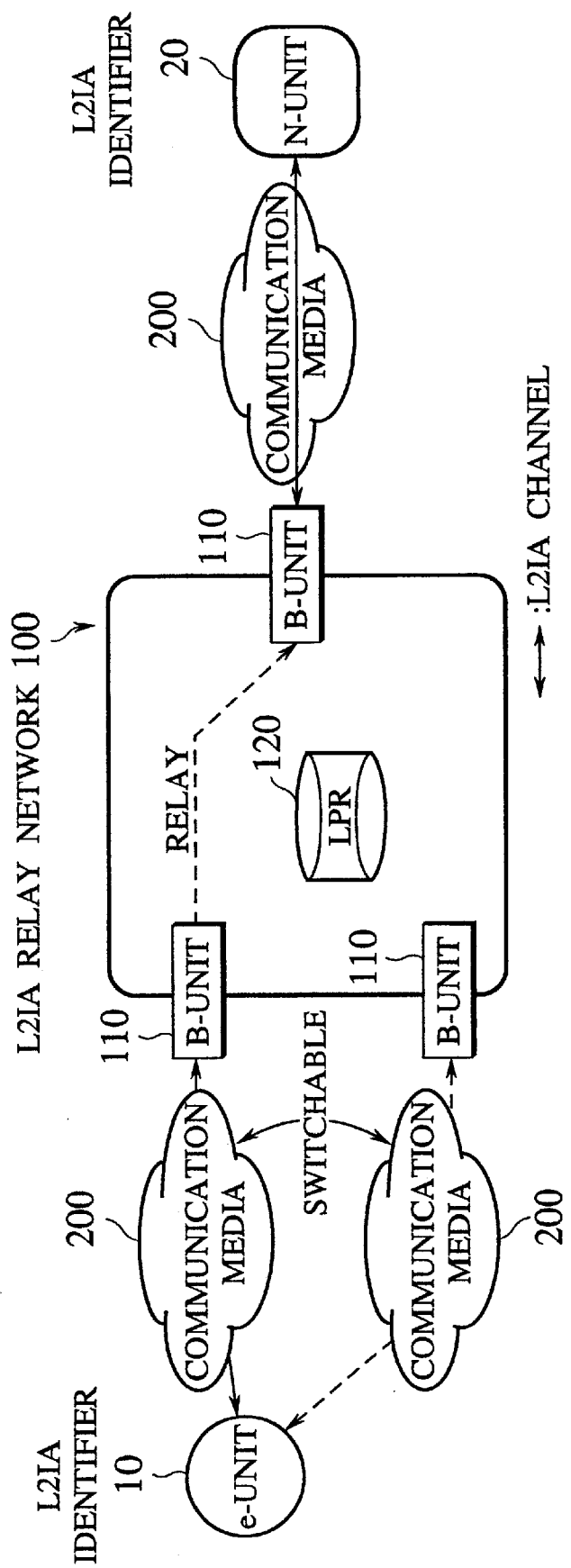
FIG. 1 is a schematic block diagram of an overall configuration of an L2 integrated access system according to one embodiment of the present invention.

FIG. 1 shows an overall configuration of an L2 integrated access system according to this embodiment, which generally comprises an L2IA (L2 Integrated Access) relay network 100 formed by B-units 110 and an LPR (Location and Preference Register) 120, and L2IA subscribers including an e-unit 10 and an N-unit 20 which can be connected with B-units 110 through various communication media 200, where the e-unit 10 is to be connected with a user terminal (not shown).

Here, the communication media 200 can be public telephone networks which have C-plane and U-plane. The C-plane is a section through which a control part of the communication media and the user terminal are to exchange information in order to realize call set up and release, various types of notification, etc., whereas the U-plane is a section through which actual user data such as speech data are to flow. Each communication medium 200 uses a Terminal ID for uniquely identifying a corresponding L2IA subscriber or B-unit within each communication medium, such as a telephone number for example, as will be described in further detail below.

As shown in FIG. 1, the e-unit 10 and the N-unit 20 are connected to the B-units 110 through various communication media 200. In the L2 integrated access scheme, an L2IA channel is established in the U-plane of these communication media 200. Here, the L2IA channel is formed by one C-plane (L2IA-C-plane) and one or more U-plane (L2IA-U-plane). The L2IA-C-plane is a control channel of the L2IA channel, which transmits signaling messages for realizing various functions of the L2 integrated access scheme such as call origination and termination, communication pause and restart control, etc. The L2IA-U-plane provides a connection for transmitting PPP (Point-to-Point Protocol) packets of the user and packets of information related to these PPP packets.

The L2 integrated access scheme of the present invention realizes various functions by allowing the L2IA subscribers, that is, the e-unit 10 and the N-unit 20, to dynamically set up and change the L2IA-U-plane in the communication network of FIG. 1.

Now, the L2IA subscribers, the LPR 120, and the B-units 110 that constitute the communication network of FIG. 1 will be described in detail individually.

L2IA (L2 Integrated Access) Subscribers

The L2IA subscribers are devices to be used by a user in order to utilize services of the L2 integrated access system. Basically, the user directly sets up a connection to the B-unit 110 that constitutes the L2IA relay network 100 through various communication media 200 by using the L2IA subscribers. The L2IA subscribers are provided in two forms, the e-unit 10 and the N-unit 20. The e-unit 10 is a device to be used by an individual user who moves around, and the N-unit 20 corresponds to an access server to be located at a home network of the user, which is accessible from a plurality of e-units.

Figure 2:
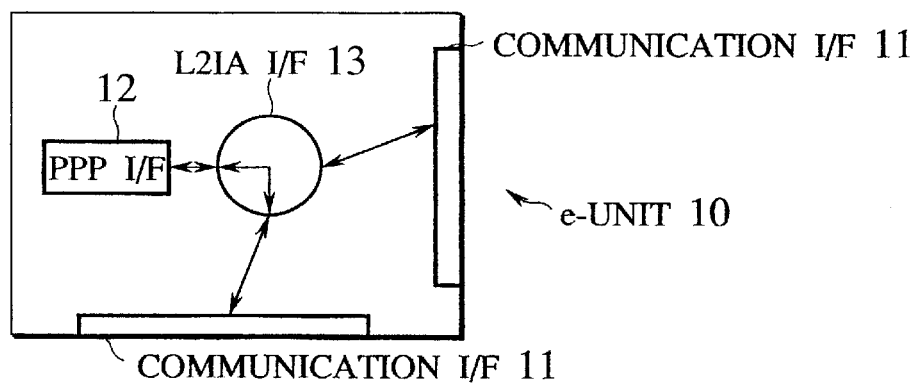
FIG. 2 is a block diagram of one exemplary internal configuration of an e-unit in the L2 integrated access system of FIG. 1.
Figure 3:
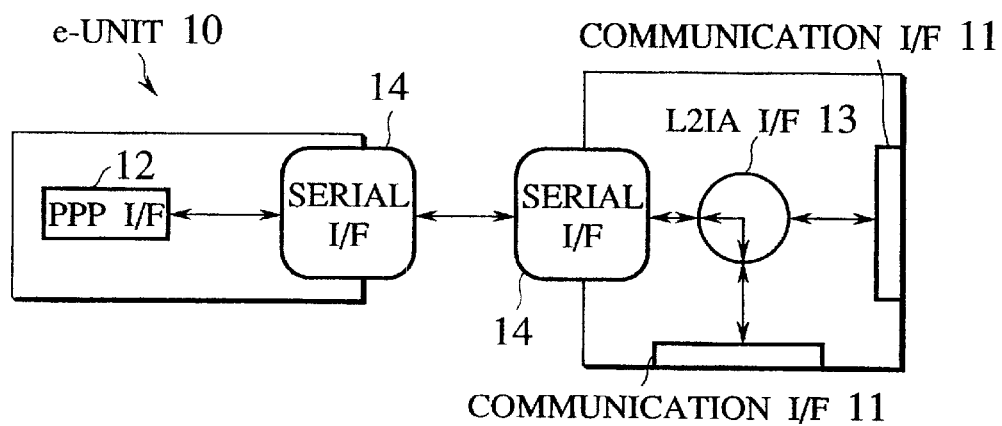
FIG. 3 is a block diagram of another exemplary internal configuration of an e-unit in the L2 integrated access system of FIG. 1.

As shown in FIG. 2, the e-unit 10 has a plurality of communication interfaces 11 such as interface cards in correspondence to communication media for setting up connections with the B-units 110, a PPP interface 12 for exchanging the user's PPP packet flowing through the L2IA-U-plane with the user terminal, and an L2IA interface 13 for connecting the communication interfaces 11 and the PPP interface 12 regardless of connection formats of the communication interfaces 11 and the PPP interface 12. Alternatively, the e-unit 10 may have a configuration as shown in FIG. 3 where the PPP interface 12 and the L2IA interface 13 are connected via serial interfaces 14.

In practice, this e-unit 10 can be provided in a form of a PCMCIA (Personal Computer Memory Card international Association) card implemented with a software for realizing functions of this e-unit 10, which is to be installed on the user terminal to be used. Note that the commonly used PCMCIA cards are those of a modem, a network adaptor for Ethernet, Token Ring, etc., and a flash memory card, but PCMCIA cards can also be of a wireless LAN adaptor, a SCSI adaptor, etc.

This e-unit 10 is a device that can establish the L2IA-U-plane with respect to a specified L2IA subscriber. At a time of utilizing the L2IA integrated access scheme, the individual user installs the e-unit 10 on his/her own user terminal in order to establish the L2IA-U-plane. The e-unit 10 has a plurality of communication interfaces in correspondence to the communication media so that it can directly set up a connection to the B-unit 110 through the communication media. The e-unit 10 establishes the L2IA channel that has only the L2IA-U-plane in the U-plane of the communication media.

Figure 4:
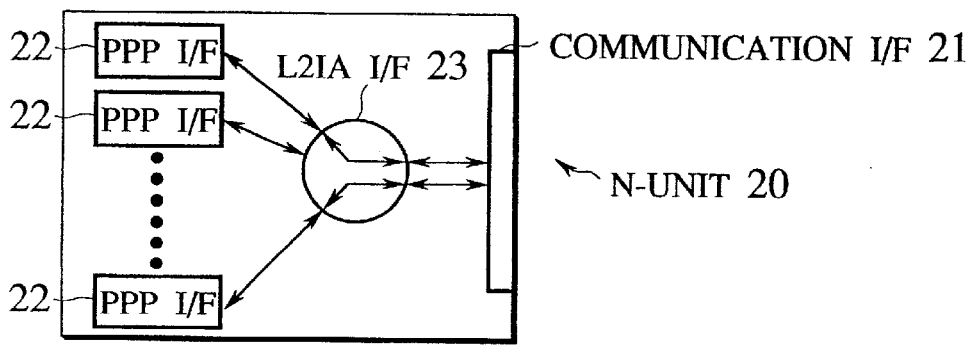
FIG. 4 is a block diagram of one exemplary internal configuration of an N-unit in the L2 integrated access system of FIG. 1.

On the other hand, as shown in FIG. 4, the N-unit 20 has a communication interface 21 such as an interface card in correspondence to communication medium for setting up a connection with the B-unit 110, a plurality of PPP interfaces 22 for exchanging the user's PPP packets flowing through the L2IA-U-plane with a plurality of user terminals, and an L2IA interface 23 for connecting the communication interface 21 and the PPP interfaces 22 regardless of connection formats of the communication interface 21 and the PPP interfaces 22.

In practice, this N-unit 20 can be provided in a form of an access router (a device for relaying data through one or more networks which supports one or more protocols) implemented with a software for realizing functions of this N-unit 20.

The N-unit 20 is a device that can establish the L2IA-U-planes with respect to a plurality of L2IA subscribers. The N-unit 20 is provided at the home network of the users of the e-units and connected with the B-unit 110 through a dedicated line, for example. The N-unit 20 has a communication interface in correspondence to the communication medium for directly setting up a connection to the B-unit 110. The N-unit 20 also terminates the PPP connections from the user terminals of users who are utilizing the L2 integrated access scheme. The N-unit 20 can establish the L2IA channel that has a plurality of L2IA-U-planes in the U-plane of the communication medium that is connected with the B-unit 110.

Each L2IA subscriber has an identifier called L2IA identifier which is uniquely defined within this L2 integrated access system. This L2IA identifier can be given in the E.164 format, for example, and will be described in further detail below.

In this embodiment, the L2IA subscriber has the following functions.

(1) Transmission and reception control function:

A function for carrying out a transmission and reception control for each communication medium, with respect to the B-unit that constitutes the L2IA relay network.

(2) Connection request function:

A function for requesting an establishment of an L2IA-U-plane up to the specified L2IA subscriber with respect to the B-unit that constitutes the L2IA relay network, by searching out the L2IA identifier for indicating a desired L2IA subscriber to be connected from a correspondence table provided therein and sending this L2IA identifier to the B-unit.

(3) L2IA channel establishing, changing and disconnecting function:

A function for establishing the L2IA channel with respect to the B-unit directly connected via the communication medium, and for dynamically establishing and changing the L2IA-U-plane to be utilized.

(4) RLD (Registered Location Data) change request function:

A function for requesting the LPR to change an RLD related to the own L2IA identifier among all RLDs, where the RLD is an information that indicates as to from which B-unit using which Terminal ID it is possible to set up a connection, as will be described in further detail below.

(5) Session information storing function:

A function for storing an immediately previous communication state using the L2IA identifier of the correspondent that can uniquely identify the L2IA-U-plane as a key, so as to be able to recover the communication state of the L2IA subscriber that requested a re-connection. This function can also be utilized at a time of communication restart for retrieving information using the L2IA identifier as a key.

(6) L2IA-U-plane identifying function:

A function for identifying the L2IA-U-plane by assigning the L2IA identifier of the L2IA subscriber on the other end of the L2IA-U-plane or by assigning an independently defined identification number to each L2IA-U-plane, so as to be able to identify a plurality of L2IA-U-planes multiplexed in a single L2IA channel.

(7) Authentication function:

A function for authenticating the other L2IA subscriber which is to become its correspondent.

(8) Network authentication function:

A function for authenticating the B-unit that constitutes the L2IA relay network.

LPR (Location and Preference Register)

Each L2IA subscriber has a media dependent identifier called Terminal ID which can uniquely identify this L2IA subscriber in each communication medium, such as a telephone number assigned within each communication medium, for the purpose of carrying out communications. This Terminal ID will be changed when the L2IA subscriber moves to a different communication medium. Each L2IA subscriber may have one or more Terminal IDs in correspondence to the communication media to be used.

In addition, in conjunction with the movement of the L2IA subscriber, the position of the appropriate B-unit (nearest one, fastest one, cheapest one, etc., or may be even a randomly selected one) to be connected with the L2IA subscriber, that is, an L2IA relay ID indicating the appropriate B-unit, will be changed. Moreover, the user can intentionally set up and change the priority level with respect to the communication media to be utilized, and the availability of the communication media will also be changed according to the channel state.

The LPR 120 is a device for managing these four types of dynamically changing data, i.e., the Terminal ID, the L2IA Relay ID, the priority level, and the communication media availability (alive flag), of which the media availability is optional, along with data indicating the corresponding communication medium, in a form of a data unit called RLD (Registered Location Data), using the L2IA identifier of the L2IA subscriber as a key that remains unchanged in the L2 integrated access scheme and that can uniquely identify the L2IA subscriber, as shown in FIG. 5.

When the L2IA subscriber has more than one potentially available communication media, the LPR 120 manages as many RLDs as the number of potentially available communication media in correspondence to the L2IA identifier of this L2IA subscriber. In each RLD for each potentially available communication medium provided in correspondence to one L2IA identifier of one L2IA subscriber, the Terminal ID indicates the media dependent identifier of that L2IA subscriber within that communication medium, the L2IA Relay ID indicates the appropriate B-unit provided in correspondence to that communication medium, the priority level indicates the priority level set up to that communication medium by the user among the potentially available communication media, and the communication media availability indicates whether that communication medium is currently available or not.

In addition, the LPR 120 is capable of constructing the L2IA relay network 100 by being inter-connected with the other B-units and the other LPRs. This L2IA relay network 100 uses an L2IA relay ID that can uniquely identify each B-unit 110 or LPR 120 within this L2IA rlay network 100.

Figure 6:
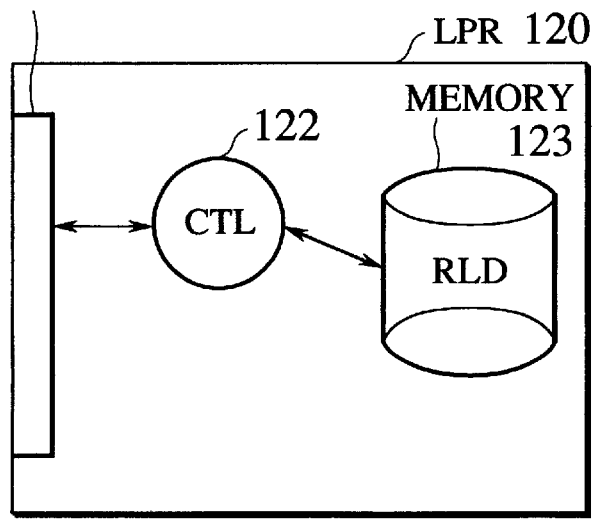
FIG. 6 is a block diagram of one exemplary internal configuration of an LPR in the L2 integrated access system of FIG. 1.

As shown in FIG. 6, the LPR 120 has a communication interface 121 through which communications with B-units and other LPRs that constitute the L2IA relay network 100 are to be carried out, so as to exchange information necessary for signaling operations, a controller (CTL) 122 for controlling the operations of the LPR 120, and a memory 123 for storing RLDs. In addition, the LPR 120 updates the registered information according to a request from the B-unit so as to maintain the latest information.

In practice, the LPR 120 can be provided in a form of a device for maintaining and managing database such as PC, Workstation, etc.

In this embodiment, the LPR 120 has the following functions.

(1) Authentication function:

A function for carrying out authentication in response to the L2IA identifier authentication request from the B-unit constituting the L2IA relay network, and returning the authentication result to that B-unit, and authentication of the B-unit itself.

(2) MARLD (Most Appropriate RLD) sending function:

A function for searching out the RLD with the highest priority level that is currently available (called MARLD) among all the RLDs related to the destination L2IA identifier, by using the L2IA identifier sent from the B-unit that constitutes the L2IA relay network as a search key, and returning this MARLD to the B-unit that issued the request.

(3) A position registration function:

A function for changing each data field of the RLD related to each L2IA identifier according to a request from the L2IA subscriber or B-unit.

B-unit

The B-unit 110 has the L2IA relay ID for uniquely identifying itself within the L2IA relay network 100, and establishes the relay network U-plane with respect to the other B-unit within the L2IA relay network 100. This relay network U-plane (Relay-U-plane) relays the L2IA-U-plane, while the relay network C-plane (Relay-C-plane) exchanges signaling messages with respect to the other B-unit or LPR. The B-unit 110 is also a device for establishing the L2IA channel with respect to the L2IA subscriber. Each B-unit is provided in correspondence to a specific communication medium and assigned with a unique Terminal ID for identifying this B-unit within that specific communication medium. Note that more than one B-units may be provided in correspondence to some specific communication medium, if desired.

Figure 7:
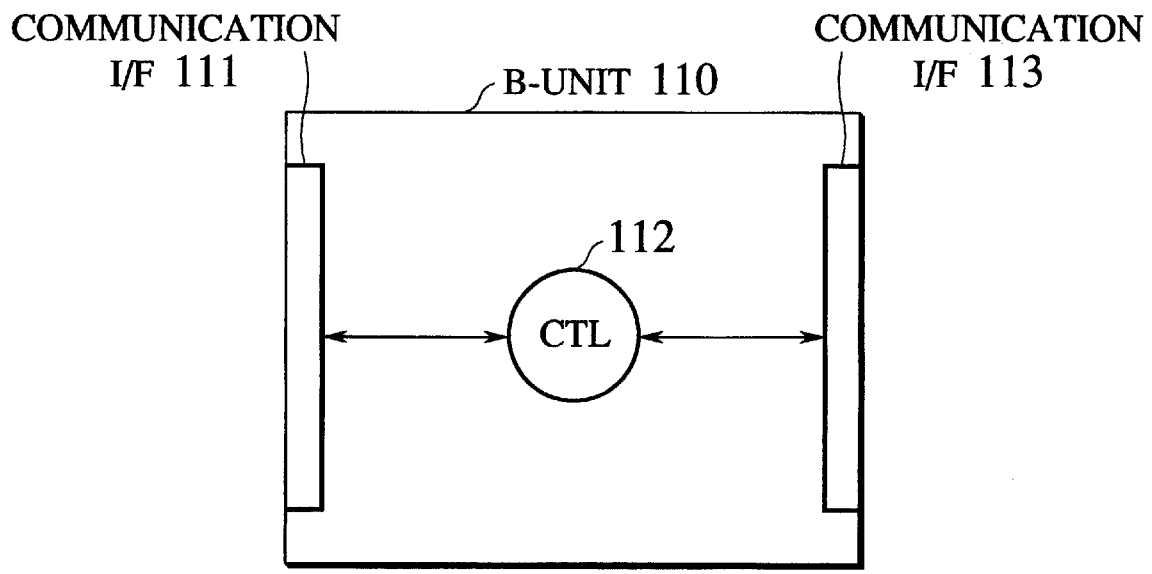
FIG. 7 is a block diagram of one exemplary internal configuration of a B-unit in the L2 integrated access system of FIG. 1.

As shown in FIG. 7, the B-unit 110 has a communication interface 111 in correspondence to the communication medium for directly transmitting or receiving with respect to the L2IA subscriber used by the user, such as an interface card for example, a controller (CTL) 112 for controlling the operations of the B-unit 110, and a communication interface 113 for carrying out communications with the B-unit or LPR such as an IP interface for example.

In practice, the B-unit can be provided in a form of an access router implementing a software for realizing functions of this B-unit 110.

In this embodiment, the B-unit 110 has the following functions.

(1) Transmission and reception control function:

A function for carrying out a transmission and reception control for each communication medium, with respect to the L2IA subscriber of the user.

(2) Position query function:

A function for inquiring to the LPR 120 about the MARLD related to the L2IA identifier of the other L2IA subscriber which is to become its correspondent and which is specified by the connected L2IA subscriber. To this end, the query is made by sending L2IA identifiers of the source and the destination in pair, or an L2IA identifier to be used as a search key.

(3) RLD change request function:

A function for requesting the LPR 120 to change the RLD information related to the specified L2IA identifier.

(4) Relay-U-plane establishing, disconnecting and changing function:

A function for establishing/disconnecting the Relay-U-plane with respect to the specified B-unit by using the Relay-C-plane signaling, and dynamically changing the Relay-U-plane according to a request from the L2IA subscriber.

(5) Handover data storing function:

A function for storing data called handover data (HD) upon receiving a handover request from the L2IA subscriber. Here, the handover data HD is a data comprising an ID for uniquely identifying each handover at the B unit that received the request, the L2IA relay ID of the B unit that received the request, an information indicating the L2IA subscriber pair that are currently in communication, and an information indicating that the handover is in progress.

Overall Functions

With the configuration described above, the L2IA system of this embodiment realizes the following overall functions.

(1) Dial-up connection function:

The e-unit selects the communication medium and sets up a connection to the appropriate B-unit (Be-unit) by transmitting a connection information using the transmission and reception control function. After the connection set up, the e-unit sends to the Be-unit the own L2IA identifier (source L2IA identifier) and the L2IA identifier (destination L2IA identifier) of the L2IA subscriber which is to become its correspondent, and the Be-unit inquires the LPR about the RLD related to the destination L2IA identifier by sending the source and destination L2IA identifiers pair or the destination L2IA identifier to the LPR. Upon obtaining the RLD, the Be-unit requests the transmission toward the Terminal ID of the L2IA subscriber that has the destination L2IA identifier, to the B-unit (BN-unit) indicated by the obtained RLD, while the source L2IA identifier is notified to the BN-unit by either the Be-unit or the LPR.

Then, the BN-unit carries out the connection set up and the transmission toward the specified Terminal ID by using the transmission and reception control function, and sends the source L2IA identifier to the N-unit. The N-unit issues a connection permission based on the received source L2IA identifier, and then the BN-unit establishes the L2IA-U-plane between the BN-unit and the N-unit, and notifies the connection permission for the e-unit to the Be-unit. Upon receiving this notification, the Be-unit establishes the Relay-U-plane between the Be-unit and the BN-unit. Then, the Be-unit notifies the connection permission to the e-unit and establishes the L2IA-U-plane between the Be-unit and the e-unit.

By this dial-up connection function, it becomes possible to establish the L2IA-U-plane with respect to the specified L2IA subscriber regardless of where the L2IA subscriber has moved or what communication medium the L2IA subscriber uses.

(2) Dial-out connection function:

The N-unit sends the own L2IA identifier (source L2IA identifier) and the L2IA identifier (destination L2IA identifier) of the L2IA subscriber which is to become its correspondent, to the connected B-unit (BN-unit). If the N-unit is currently not connected with the BN-unit, the N-unit transmits the Terminal ID of the BN-unit and sets up a connection by using the transmission and reception control function. Then, the BN-unit inquires the LPR about the RLD with the highest priority level that is currently available among the RLDs related to the destination L2IA identifier by sending the source and destination L2IA identifiers pair or the destination L2IA identifier to the LPR. Upon obtaining this RLD, the BN-unit requests the transmission toward the Terminal ID of the L2IA subscriber to the B-unit (Be-unit) indicated by that RLD, while the source L2IA identifier is notified to the Be-unit either by the BN-unit or the LPR.

Then, the Be-unit attempts the connection set up and the transmission toward the Terminal ID by using the transmission and reception control function. If the connection set up fails, the Be-unit notifies this fact to the BN-unit, and the BN-unit notifies the connection set up failure to the LPR. Upon receiving this notification, the LPR changes the corresponding RLD, and returns a new RLD with the highest priority level that is currently available after the change to the BN-unit. Upon receiving this new RLD, the BN-unit requests the transmission to the corresponding B-unit (Be-unit) similarly as described above.

After the connection to the e-unit is set up, the Be-unit sends the source L2IA identifier to the e-unit, and the e-unit judges the connection permission according to the received source L2IA identifier and notifies the connection permission to the Be-unit. Upon receiving the connection permission, the Be-unit establishes the L2IA-U-plane between the Be-unit and the e-unit, and notifies the connection permission to the BN-unit. Upon receiving this notification, the BN-unit establishes the Relay-U-plane between the BN-unit and the Be-unit. Then, the BN-unit notifies the connection permission to the N-unit and establishes the L2IA-U-plane between the BN-unit and the N-unit.

By this dial-out connection function, it becomes possible to establish the L2IA-U-plane with respect to the e-unit from the server (N-unit) side regardless of which communication medium the e-unit has moved to, and the connection to the user terminal can be given by a connection in the communication media that reflects the priority level set by the user at the user terminal.

(3) Handover function—Scenario I:

When the e-unit sets up a connection to a B-unit (B1-unit) using the communication medium and is connected further to the N-unit via a B-unit (BN-unit) and in communication, the e-unit issues a handover request to the B1-unit, and then sets up a connection to another B-unit (B2-unit) using another communication medium by the procedure similar to the dial-up connection and specifies the L2IA identifier of the connection target N-unit to the B2-unit. Upon receiving this request, the B2-unit requests the RLD related to the L2IA identifier of the N-unit to the LPR and obtains the RLD, and establishes a new Relay-U-plane up to the BN-unit. Then, the e-unit establishes the L2IA-U-plane between the e-unit and the B2-unit, and changes the L2IA-U-plane through which user data are to flow, from one via the B1-unit to one via the B2-unit.

By this handover function, it becomes possible to change the communication media without interrupting the user's communication.

(4) Handover Function—Scenario II:

When the e-unit sets up a connection to a B-unit (B1-unit) using the communication medium and is connected further to the N-unit via a B-unit (BN-unit) and in communication, the e-unit issues a handover request to the B1-unit, and then the B1-unit requests the MARLD to the LPR using the L2IA identifier of the e-unit as a key and obtains the MARLD. The B1-unit also stores the handover data (HD) for distinguishing the L2IA-U-plane to carry out the handover, and sends the MARLD, the L2IA identifier of the e-unit, and the HD to another B-unit (B2-unit) indicated by the MARLD.

Then, the B2-unit carries out the connection set up and the transmission toward the Terminal ID indicated by the MARLD. If the connection set up fails, the B2-unit notifies this fact to the B1-unit. Upon receiving this notification, the B1-unit requests the change of the RLD and a new MARLD after the change to the LPR and obtains this new MARLD, and then the B2-unit attempts the set up of the connection to the e-unit again.

When the connection set up succeeds, the B2-unit establishes the L2IA-U-plane between the B2-unit and the e- unit, and notifies the B1-unit about the establishment of the connection between the B2-unit and the e-unit. Then, the B1-unit establishes the Relay-U-plane between the B1-unit and the B2-unit and changes the L2IA-U-plane of the user into the communication utilizing the L2IA-U-plane between the B2-unit and the e-unit, and notifies the HD and the L2IA Relay ID of the B2-unit to the BN-unit. Upon receiving this notification, the BN-unit establishes the Relay-U-plane between the BN-unit and the B2-unit for the purpose of relaying the L2IA-U-plane identified by the HD, and after the Relay-U-plane is established, relays the L2IA-U-plane to the B2-unit (instead of the B1-unit). Then, the use of the Relay-U-planes between the B1-unit and the B2-unit and between the BN-unit and the B1-unit is terminated, and the communication using the Relay-U-plane between the BN-unit and the B2-unit alone is continued.

By this handover function, it becomes possible to change the communication media without interrupting the user's communication.

(5) Re-connection function:

When the communication between the L2IA subscribers is disconnected, the L2IA subscriber sets up a connection to the B-unit using either a new communication medium to be utilized or the combination medium that has been utilized immediately previously, and specifies the L2IA identifier (destination L2IA identifier) of the correspondent of the communication again, so as to re-establish the L2IA-U-plane by using the dial-up connection function between the source and destination L2IA subscribers. In response to this re-connection request, the destination L2IA subscriber searches out the stored re-connection information by using the source L2IA identifier as a key, and when the corresponding re-connection information exists, the destination L2IA subscriber restarts the connection set up using the searched out re-connection information.

By this re-connection function, it becomes possible to restart the communication from the immediately previous communication state, regardless of the communication media to be utilized.

<Overall Effects>

In this L2 integrated access scheme, the B-unit functioning as an access point for the e-unit and the B-unit function as an access point for the N-unit are provided separately. By phyisally separating these B-units and forming the relay network from a plurality of B-units, it is possible to realize the scalability.

Moreover, in this L2 integrated access scheme, the L2IA subscriber sets up the connection to the B-unit by using various types of communication media, and the user's data are relayed by the relay network formed by the B-units and conveyed to the correspondent L2IA subscriber via the B-unit which is capable of setting up a connection to the correspondent L2IA subscriber. By freely relaying the user data through the relay network formed by the B-units, the difference in the communication media is absorbed, and by specifying the L2IA identifier that is not dependent on the communication media as a connection target, it becomes possible to establish the communication path that is not dependent on the communication media.

In addition, it is the B-unit which carries out the transmission and reception with respect to the communication media so that it becomes possible to deal with a new communication medium by incorporating a new communication interface correspoding to that new communication medium at the B-unit. From a viewpoint of the L2IA subscribers, it becomes possible to make accesses to the N-unit by utilizing the new communication medium by incorporating a new communication interface corresponding to the new communication medium only in the e-unit among the L2IA subscribers, without requiring any change to the N-unit.

Also, the call is terminated once at the B-unit on the L2IA relay network side, so that by relaying through the relay network it becomes possible to set up a connection up to a correspondent which is located on a network to which a connection cannot be set up directly. Consequently, it becomes possible to freely choose the connection target network.

Furthermore, it becomes possible to change the communication media to be utilized by the user without disconnecting the communication once. Also, it becomes possible to set up dial-out connections from the server side to many user sides.

Also, this L2 integrated access scheme is not dependent on the layer 3 protocol such as IP so that it is possible to utilize the existing network environment that does not use IP without requiring any change. Namely, when the layer 2 is taken to be an end-to-end link by physical media such as ISDN and telephone networks and the layer 3 is taken to be TCP/IP generally utilized in the computer communication, the L2IA integrated access scheme of the present invention lies between the layer 2 and the layer 3, and can be viewed as a technique for constructing a virtual end-to-end link without depending on physical media to be utilized for communications. This is the reason why it is called L2 integrated access. In other words, according to the present invention, the L2IA channel formed by L2IA-C(Control)-plane and L2IA-U(User)-plane is logically established in the U-plane of the physical communication media, where L2IA-U-plane for actually exchanging user data is established by necessary data exchange by the L2IA-C-plane.

<Signaling operations>

Now, the signaling operations for realizing the above described overall functions of the L2IA system of this embodiment will be described in detail.

Note that, in the following descriptions, a connection is a generic term for C-plane and U-plane, a C-plane is a connection for exchanging control information, a U-plane is a connection for exchanging user data, Relay-C-plane and Relay-U-plane are C-plane and U-plane on the L2IA relay network, L2IA-C-plane and L2IA-U-plane are C-plane and U-plane between L2IA subscribers, and an L2IA channel is a bundle of C-plane and U-plane.

Figure 8B:
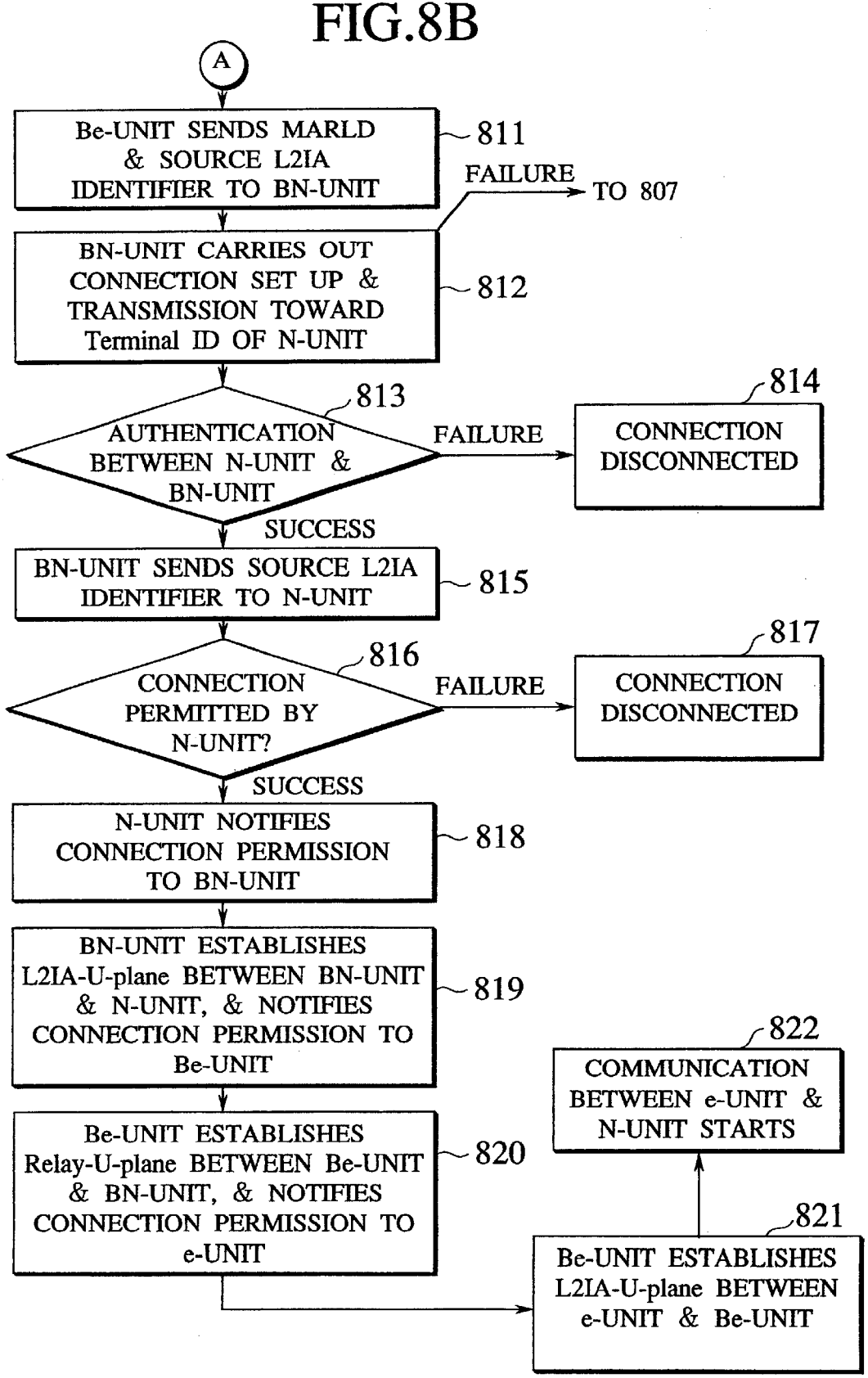

(1) Dial-up connection:

The dial-up connection from the e-unit to the N-unit is realized according to the flow chart of FIGS. 8A and 8B as follows.

Using the desired communication medium of the user, the e-unit sets up a connection to the appropriate B-unit (Be-unit) that can be connected by that communication medium, by obtaining the Terminal ID uniquely defined within that communication medium that is assigned in advance to the Be-unit (step 801). Here, the Terminal ID can be obtained from a table of correspondence between each communication medium and the Terminal ID of a corresponding B-unit that is provided in advance at the e-unit or by the network support, or else the well known (i.e., publicly disclosed) Terminal ID of the Be-unit can be used.

When the connection is set up, the Be-unit exchanges data with the L2IA subscriber (e-unit) used by the user so as to carry out the mutual authentication (step 802). Here, the data to be utilized in the authentication can be the L2IA identifier (source L2IA identifier) of the e-unit and the Terminal ID of the Be-unit, for example. When the authentication fails, the channel between the Be-unit and the e-unit is disconnected and the operation is terminated (step 803).

When the authentication succeeds at the step 802, the e-unit obtains the L2IA identifier (destination L2IA identifier) of the correspondent L2IA subscriber (N-unit) to be connected, and sends the destination L2IA identifier to the Be-unit (step 804). Here, the destination L2IA identifier can be obtained from a table of correspondence between each connection target and the L2IA identifier assigned to it that is provided in advance at the e-unit.

Then, the Be-unit exchanges data with the LPR so as to carry out the mutual authentication (step 805). When the authentication fails, the channel between the Be-unit and the e-unit is disconnected and the operation is terminated (step 806).

When the authentication succeeds at the step 805, the Be-unit sends the source and destination L2IA identifiers pair or an L2IA identifier to be used as a search key to the LPR so as to request the RLD with the highest priority level set by the user of the L2IA subscriber (N-unit) that has the destination L2IA identifier and that is currently available, called MARLD. In response, the LPR searches out the MARLD by using the destination L2IA identifier as a key, and sends the MARLD to the Be-unit (step 807). Here, the LPR may judge the connection permission according to the received source and destination L2IA identifiers pair if necessary. According to the obtained MARLD, the Be-unit can ascertain the B-unit (BN-unit) which is appropriate for setting up a connection to the correspondent L2IA subscriber (N-unit) that has the destination L2IA identifier, a communication medium to be utilized for setting up a connection to the correspondent L2IA subscriber, and the Terminal ID of the correspondent L2IA subscriber in that communication medium.

Then, the Be-unit exchanges data with the BN-unit indicated by the MARLD so as to carry out the mutual authentication (step 808). When the authentication fails, the channel between the Be-unit and the e-unit is disconnected and the operation is terminated (step 809).

When the authentication succeeds at the step 808, the Be-unit establishes a Relay-U-plane through which data to be exchanged between the Be-unit and the BN-unit are to flow, if necessary (step 810).

Then, the Be-unit, sends the MARLD obtained from the LPR and the source L2IA identifier to the BN-unit (step 811).

Next, the BN-unit carries out the connection set up by using the communication medium indicated by the MARLD and the transmission toward the Terminal ID of the N-unit indicated by the MARLD so as to try to establish the connection up to the N-unit (step 812). This step 812 can be omitted if the N-unit is connected by a dedicated line. When the connection cannot be established, the BN-unit notifies this fact to the Be-unit. Upon receiving this notification, the Be-unit requests the LPR to change the availability information in the RLD of the communication medium for which the connection establishing failed, from "alive" state to "dead" state. Then, after receiving a notice for completion of the RLD change from the LPR, the operation returns to the step 807 described above.

When the connection up to the N-unit located at the connection target network is established at the step 812, the BN-unit exchanges data with the N-unit so as to carry out the mutual authentication (step 813). Here, the data to be utilized in the authentication can be the L2IA identifier (destination L2IA identifier) of the N-unit and the Terminal ID of the BN-unit, for example. When the authentication fails, the entire connection is disconnected and the operation is terminated (step 814).

When the authentication succeeds at the step 813, the BN-unit sends the source L2IA identifier to the N-unit (step 815), and the N-unit judges whether or not to permit the connection according to the received source L2IA identifier (step 816). When the connection is not permitted, the entire connection is disconnected and the operation is terminated (step 817). When the connection is permitted by the N-unit at the step 816, the N-unit notifies the connection permission to the BN-unit (step 818).

Upon receiving this notification, the BN-unit establishes an L2IA-U-plane between the BN-unit and the N-unit through which the user's communication data in a form of PPP packets and PPP related information are to flow between the BN-unit and the N-unit, and notifies the connection permission for the e-unit to the Be-unit (step 819).

Upon receiving this notification, the Be-unit establishes a Relay-U-plane through which the user's PPP packets and PPP related information are to flow between the Be-unit and the BN-unit, and notifies the connection permission to the e-unit (step 820). Then, the Be-unit establishes an L2IA-U-plane between the Be-unit and the e-unit through which the user's PPP packets and PPP related information are to flow between the Be-unit and the e-unit (step 821). As a result, the communication path through which the user's PPP packets and PPP related information are to flow is established between the e-unit and the N-unit so that the communication between the e-unit and the N-unit is started (step 822).

In this manner, it becomes possible for the user to freely set up a connection to any desired network by setting up a connection to the appropriate B-unit by using the desired communication medium and by specifying the L2IA identifier of a desired correspondent to be connected.

Figure 9A:
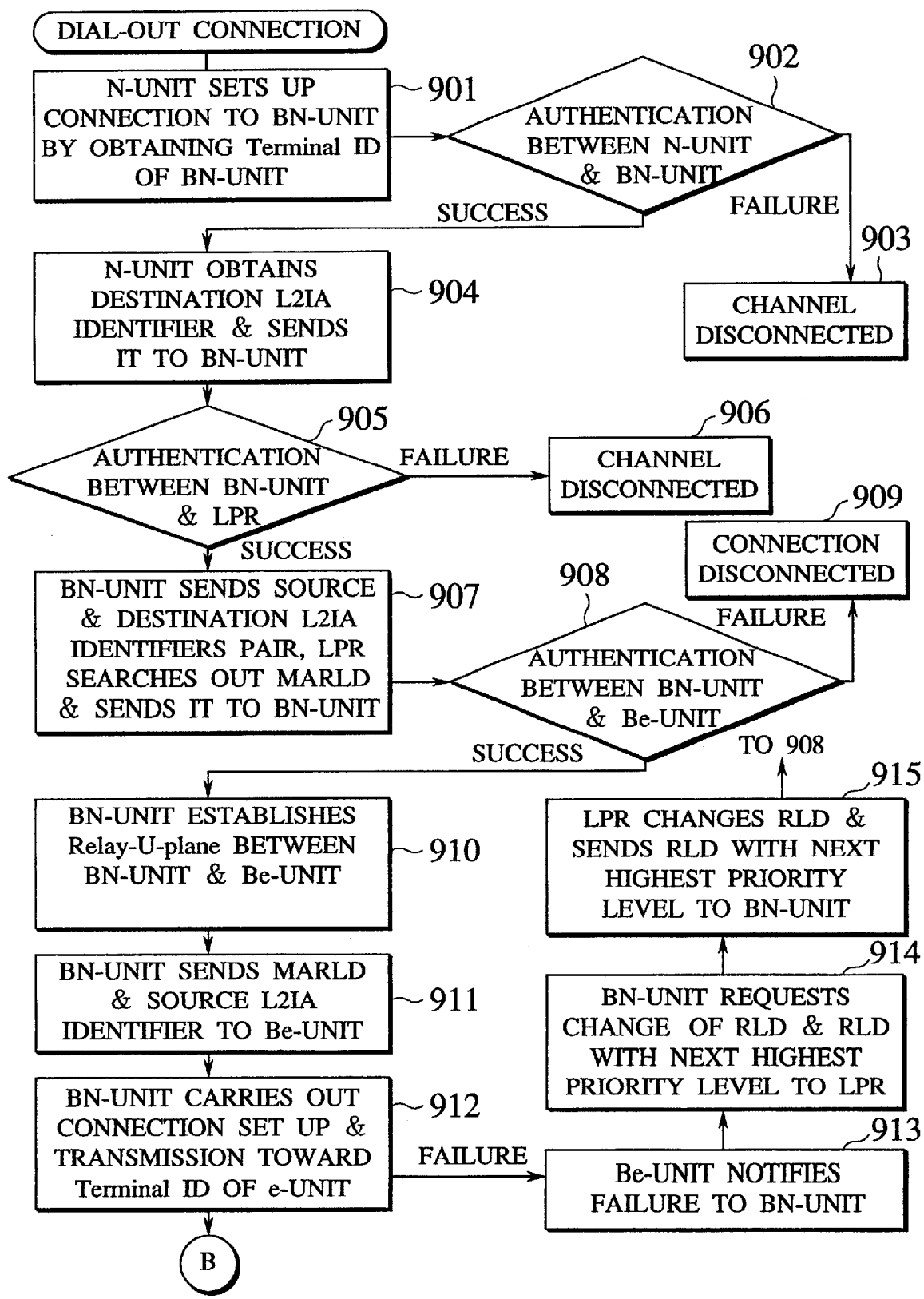
FIGS. 9A and 9B are a flow chart for an exemplary signaling operation to realize a dial-out connection in the L2 integrated access system of FIG. 1.
Figure 9B:
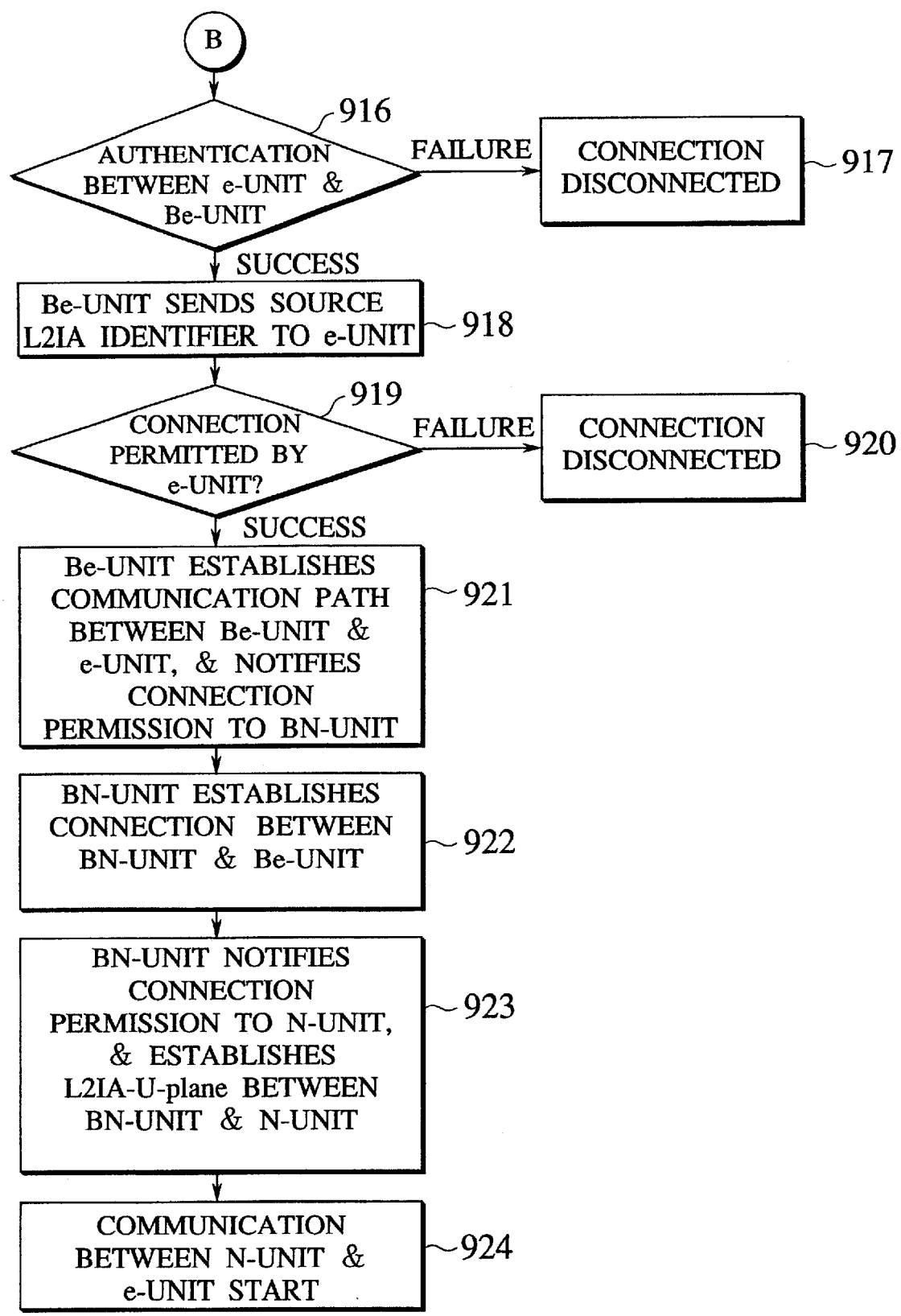

(2) Dial-out connection:

The dial-out connection from the N-unit to the e-unit is realized according to the flow chart of FIGS. 9A and 9B as follows.

The N-unit located at the user's home network tries to establish a connection to the BN-unit, by obtaining the Terminal ID which is assigned in advance to the BN-unit (step 901). Here, the Terminal ID can be obtained from a table of correspondence between each communication medium and the Terminal ID of a corresponding B-unit that is provided in advance at the N-unit, or the well known (i.e., publicly disclosed) Terminal ID of the BN-unit can be used.

Then, if necessary, the N-unit exchanges data with the BN-unit so as to carry out the mutual authentication (step 902). Here, the data to be utilized in the authentication can be the L2IA identifier (source L2IA identifier) of the N-unit and the Terminal ID of the BN-unit, for example. When the authentication fails, the channel between the BN-unit and the N-unit is disconnected and the operation is terminated (step 903).

When the authentication succeeds at the step 902, the N-unit obtains the L2IA identifier (destination L2IA identifier) of the correspondent L2IA subscriber (e-unit) to be connected, and sends the destination L2IA identifier to the BN-unit (step 904). Here, the destination L2IA identifier can be obtained from a table of correspondence between each connection target and the L2IA identifier assigned to it that is provided in advance at the the N-unit.

Then, the BN-unit exchanges data with the LPR so as to carry out the mutual authentication (step 905). When the authentication fails, the channel between the BN-unit and the N-unit is disconnected and the operation is terminated (step 906).

When the authentication succeeds at the step 905, the BN-unit sends the source and destination L2IA identifiers pair or an L2IA identifier to be used as a search key to the LPR so as to request the RLD with the highest priority level set by the user of the e-unit that has the destination L2IA identifier and that is currently available, called MARLD. In response, the LPR searches out the MARLD by using the destination L2IA identifier as a key, and sends the MARLD to the BN-unit (step 907). Here, the LPR may judge the connection permission according to the received source and destination L2IA identifiers pair if necessary.

Then, the BN-unit exchanges data with the Be-unit indicated by the MARLD so as to carry out the mutual authentication (step 908). When the authentication fails, the connection between the BN-unit and the N-unit is disconnected and the operation is terminated (step 909).

When the authentication succeeds at the step 908, the BN-unit establishes a Relay-U-plane between the BN-unit and the Be-unit, if necessary (step 910).

Then, the BN-unit sends the MARLD obtained from the LPR and the source L2IA identifier to the Be-unit (step 911).

Next, the Be-unit carries out the connection set up by using the communication medium indicated by the MARLD and the transmission toward the Terminal ID of the e-unit indicated by the MARLD so as to try to establish the connection up to the e-unit (step 912). When the connection cannot be established, the Be-unit notifies this fact to the BN-unit (step 913). Upon receiving this notification, the BN-unit requests the LPR to change the RLD of the communication medium for which the connection establishing failed among the RLDs related to the destination L2IA identifier, and requests the RLD with the next highest priority level (step 914). In response, the LPR changes the availability information in the RLD for that communication medium into "dead" state or "unknown" state, and sends the RLD with the next highest priority level set up by the user at that point to the BN-unit (step 915).

When the connection up to the e-unit is established at the step 912, the Be-unit exchanges data with the e-unit so as to carry out the mutual authentication (step 916). When the authentication fails, the entire connection is disconnected and the operation is terminated (step 917).

When the authentication succeeds at the step 916, the Be-unit sends the source L2IA identifier to the e-unit (step 916), and the e-unit judges whether or not to permit the connection according to the received source L2IA identifier (step 919). When the connection is not permitted, the entire connection is disconnected and the operation is terminated (step 920).

When the connection is permitted by the e-unit at the step 819, the Be-unit establishes a communication path through which the user's PPP packets and PPP related information are to flow between the Be-unit and the e-unit, and notifies the connection permission for the N-unit to the BN-unit (step 921).

Upon receiving this notification, the BN-unit establishes a connection through which the user's PPP packets and PPP related information are to flow between the BN-unit and the Be-unit (step 922). Then, the BN-unit notifies the connection permission to the N-unit, and establishes an L2IA-U-plane between the BN-unit and the N-unit through which the user's packet and its related information are to flow between the BN-unit and the N-unit (step 923). As a result, the communication path through which the user's PPP packets and PPP related information are to flow is established between the N-unit and the e-unit so that the communication between the N-unit and the e-unit is started (step 924).

In this manner, it becomes possible to realize the dial-out connection from the server (N-unit) side to the e-unit carried by the moving user, regardless of where the user of the e-unit has moved and which communication medium can be used for connection to the e-unit, while realizing the communication using the communication medium that reflects the preference of the user of the e-unit.

(3) Handover:

The handover for changing the communication medium to be used by the e-unit during the communication between the N-unit and the e-unit can be realized in two alternative procedures.

Figure 10:
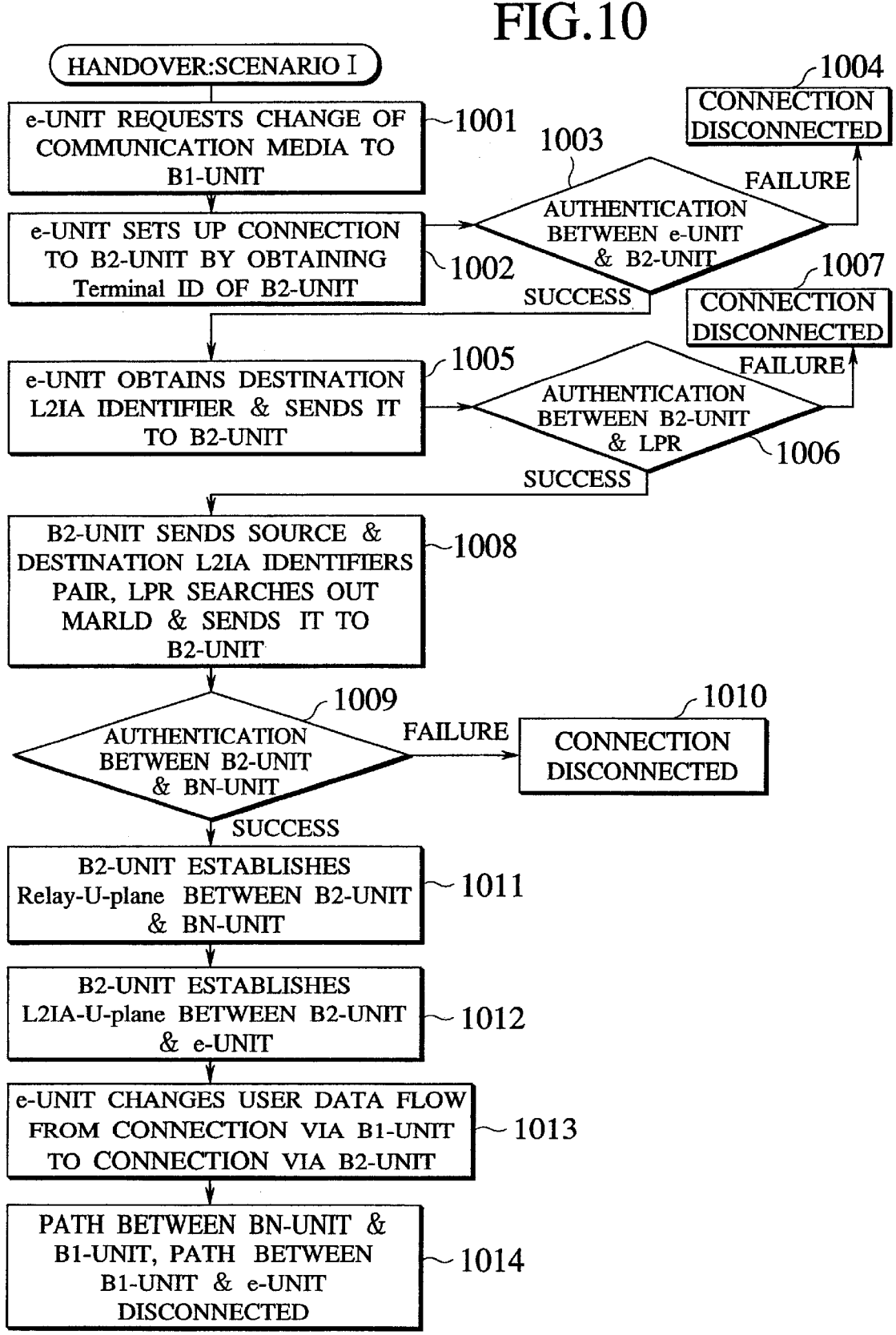
FIG. 10 is a flow chart for one exemplary signaling operation to realize a handover (scenario I) in the L2 integrated access system of FIG. 1.

(3.1) The first procedure (scenario I) proceeds according to the flow chart of FIG. 10 as follows.

The e-unit requests the change of communication medium to be utilized (handover) to the currently connected B-unit (B1-unit) (step 1001).

Then, similarly as in the dial-up connection procedure described above, using the desired communication medium of the user, the e-unit sets up a connection to another B-unit (B2-unit) by obtaining the Terminal ID which is assigned in advance to the B2-unit (step 1002).

Then, the e-unit exchanges data with the B2-unit so as to carry out the mutual authentication (step 1003). When the authentication fails, the connection between the e-unit and the B2-unit is disconnected and the operation is terminal (step 1004).

When the authentication succeeds at the step 1103, the e-unit obtains the L2IA identifier (destination L2IA identifier) of the connection target N-unit, and sends the destination L2IA identifier to the B2-unit (step 1005). Here, the destination L2IA identifier can be obtained from the correspondence table provided in the e-unit.

Then, the B2-unit exchanges data with the LPR so as to carry out the mutual authentication (step 1006). When the authentication fails, the connection between the e-unit and the B2-unit is disconnected and the operation is terminated (step 1007).

When the authentication succeeds at the step 1006, the B2-unit sends the source and destination L2IA identifiers pair or an L2IA identifier to be used as a search key to the LPR so as to request the RLD with the highest priority level that is currently available, called MARLD. In response, the LPR searches out the MARLD by using the destination L2IA identifier as a key, and sends the MARLD to the B2-unit (step 1008). According to the obtained MARLD, the B2-unit can ascertain the BN-unit.

Then, the B2-unit exchanges data with the BN-unit indicated by the MARLD so as to carry out the mutual authentication (step 1009). When the authentication fails, the connection between the e-unit and the B2-unit is disconnected and the operation is terminated (step 1010).

When the authentication succeeds at the step 1009, the B2-unit establishes a Relay-U-plane through which the user data are to flow between the B2-unit and the BN-unit (step 1011). Also, the B2-unit establishes an L2IA-U-plane between the B2-unit and the e-unit through which the user data are to flow between the B2-unit and the e-unit (step 1012).

Then, the e-unit changes the user data flow from a connection via the B1-unit to a connection via the B2-unit so as to start the communication via the B2-unit (step 1013).

Then, the communication path between the BN-unit and the B1-unit and the communication path between the B1-unit and the e-unit are disconnected (step 1014).

Figure 11A:
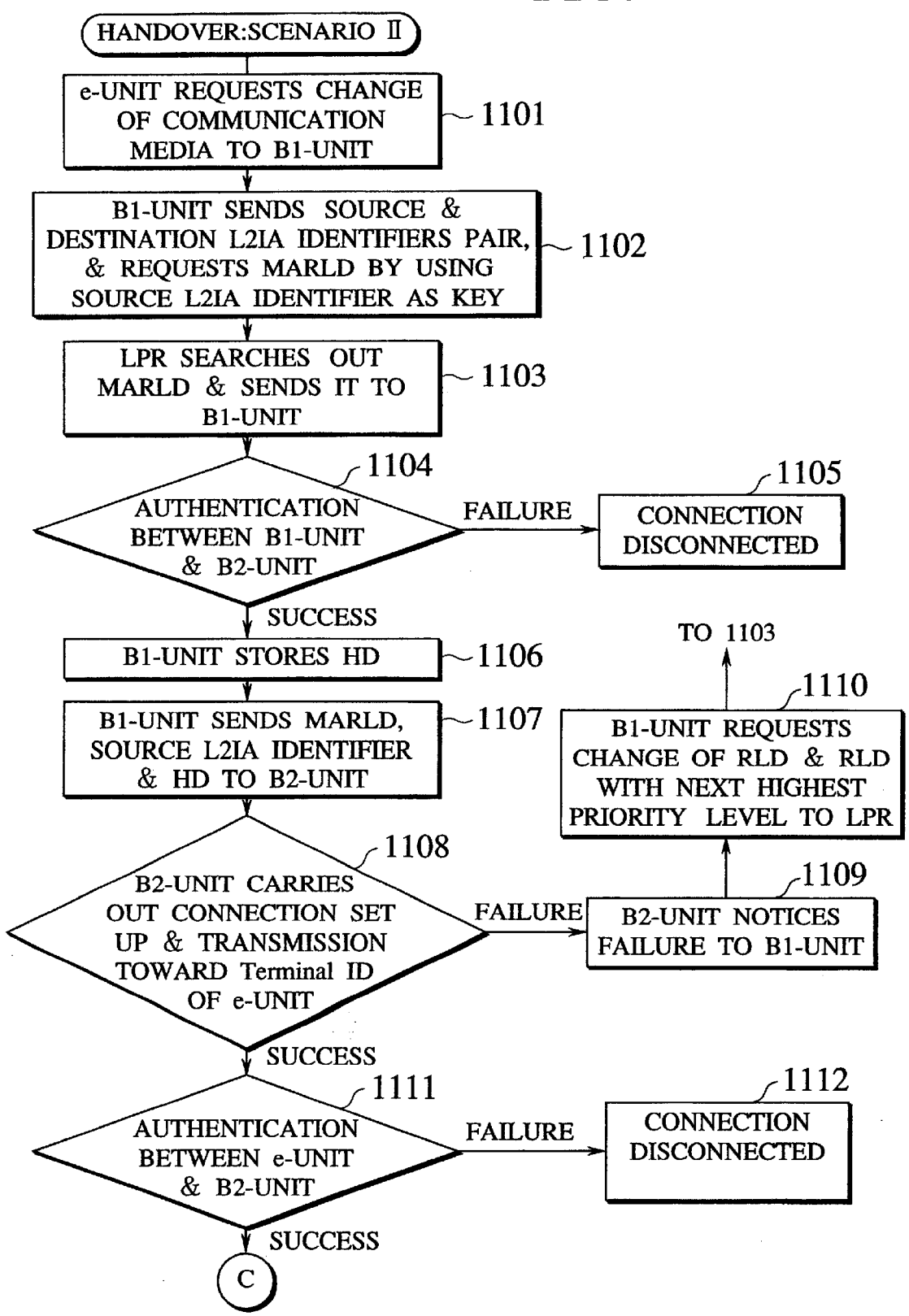
FIGS. 11A and 11B are a flow chart for another exemplary signaling operation to realize a handover (scenario II) in the L2 integrated access system of FIG. 1.
Figure 11B:
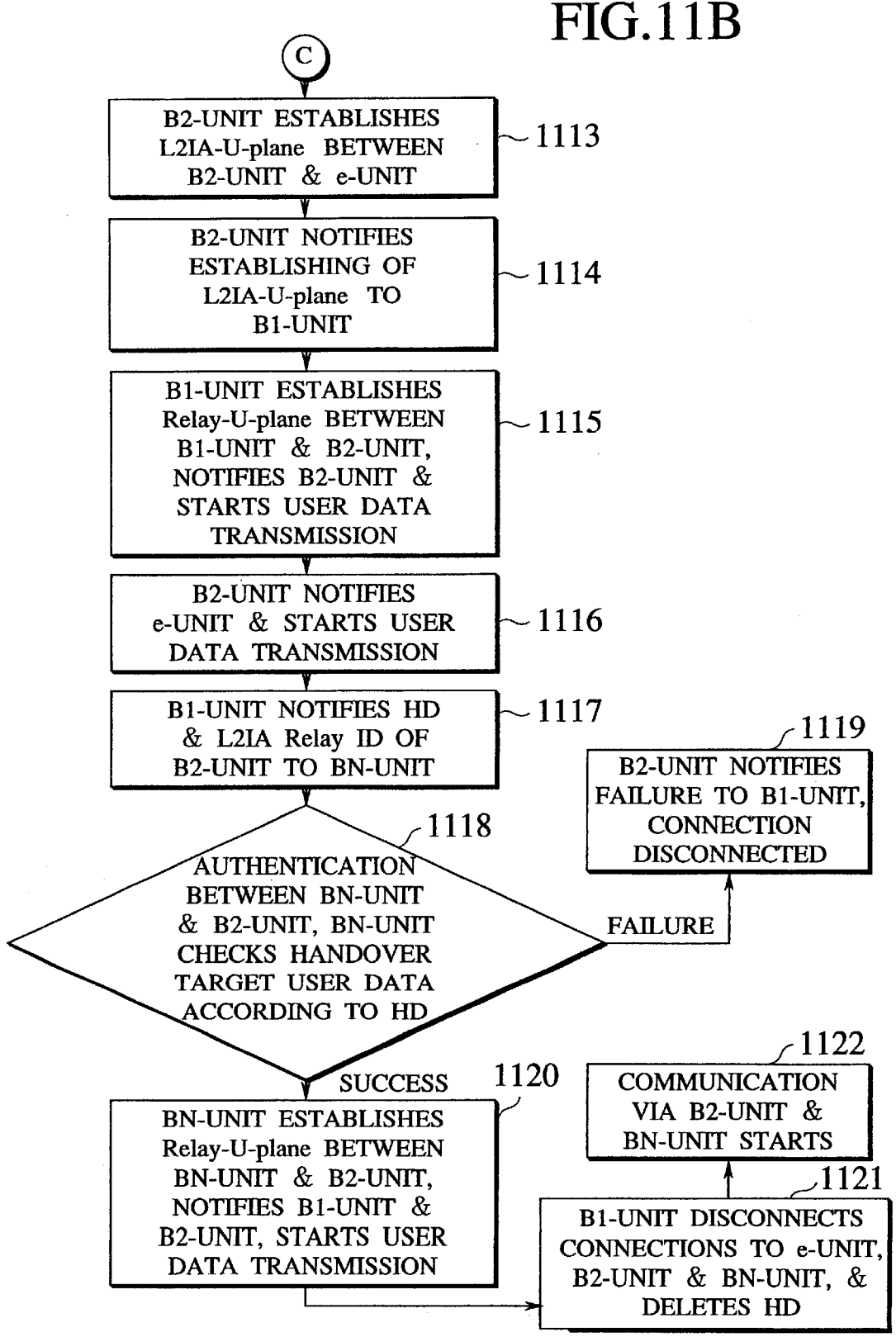

(3.2) On the other hand, the second procedure (scenario II) proceeds according to the flow chart of FIGS. 11A and 11B as follows.

The e-unit requests the change of communication medium to be utilized (handover) to the currently connected B-unit (B1-unit) (step 1101).

Then, the B1-unit sends the source and destination L2IA identifiers pair or an L2IA identifier to be used as a search key to the LPR so as to request the RLD with the highest priority level that is currently available, called MARLD, by using the source L2IA identifier as a key (step 1102). In response, the LPR searches out the MARLD by using the source L2IA identifier as a key, and sends the MARLD to the B1-unit (step 1103).

Then, the B1-unit exchanges data with the B2-unit indicated by the MARLD so as to carry out the mutual authentication (step 1104). When the authentication fails, the connection between the B1-unit and the B2-unit is disconnected and the operation is terminated (step 1105).

Next, the B1-unit stores the handover data (HD) (step 1106). Here, the handover data contain a handover ID for identifying each handover, the L2 Relay ID of the B1-unit, the source and destination L2IA identifiers pair, and a "going" information for indicating that the handover is in progress. This handover data will be used in specifying the L2IA-U-plane for which the handover is to be carried out. The L2 Relay ID of the B1-unit indicates that the L2IA-U-plane for which the handover is to be carried out is the L2IA-U-plane that is set through the B1-unit.

Then, the B1-unit sends the MARLD, the source L2IA identifier, and the HD to the B2-unit (step 1107). Upon receiving this transmission request, the B2-unit tries to establish a connection between the e-unit and the B2-unit by carrying out the connection set up and the transmission toward the Terminal ID of the e-unit by using the communication medium indicated by the received MARLD (step 1108).

When the connection establishing fails at the step 1108, the B2-unit notifies the connection establishing failure to the B1-unit (step 1108), and the B1-unit requests the LPR to change the RLD of the communication medium for which the connection establishing failed into "dead" state, and requests the RLD with the next highest priority level set by the user which is currently available (step 1110). Then, the operation returns to the step 1103.

When the connection is established at the step 1108, the B2-unit exchanges data with the e-unit so as to carry out the mutual authentication (step 1111). When the authentication fails, the connection between the e-unit and the B2-unit is disconnected and the operation is terminated (step 1112). Here, the data to be utilized in the authentication can be the Terminal ID of the B2-unit and the L2IA identifier of the e-unit, for example.

When the authentication succeeds at the step 1111, the B2-unit establishes an L2IA-U-plane between the B2-unit and the e-unit through which the user data are to flow between the e-unit and the B2-unit by using the communication medium used at the step 1108 (step 1113). Then, the B2-unit notifies the establishing of the L2IA-U-plane between the e-unit and the B2-unit to the B1-unit (step 1114).

Next, the B1-unit establishes a Relay-U-plane through which the user data are to flow between the B1-unit and the B2-unit, and notifies the B2-unit that the user data sent to the e-unit up until then will be sent to the B2-unit instead and starts the user data transmission (step 1115). Upon receiving this notification, the B2-unit notifies the e-unit that the user data will be sent and starts the data transmission (step 1116).

Then, the B1-unit notifies the HD and the L2IA Relay ID of the B2-unit to the BN-unit (step 1117). In response, the BN-unit exchanges data with the B2-unit so as to carry out the mutual authentication, and checks the handover target user data to be subjected to the handover according to the L2IA identifiers paie in the HD (step 1118). When the authentication fails, the BN-unit notifies this fact to the B1-unit, and the connection established for the purpose of the handover is disconnected and the operation is terminated (step 1119).

When the authentication succeeds at the step 1118, the BN-unit establishes a Relay-U-plane through which the user data indicated by the L2IA identifiers pair in the HD are to flow between the B2-unit and the BN-unit, and notifies the B1-unit about the stopping of the user data transmission to the B1-unit while notifying the B2-unit about the start of the user data transmission to the B2-unit and starting the user data transmission to the B2-unit (step 1120).

Upon receiving this notification, the B1-unit disconnects its connections with respect to the e-unit, the B2-unit, and the BN-unit, and deletes the stored HD (step 1121).

Then, the communication from the e-unit via the B2-unit and the BN-unit to the N-unit is started (step 1122).

By the either procedure described above, it is possible to automatically change the communication medium according to the user's desire in response to the media change request from the user.

When the user directly requests the B-unit to add the RLD related to a new communication medium and change the priority order among the communication media, the B-unit that received this request can request the change of the RLD to the LPR so that the RLD managed by the LPR can always reflect the preference of the user. Moreover, in the LPR, the RLD specifies the B-unit so that the user can always utilize the appropriate B-unit.

Figure 12:
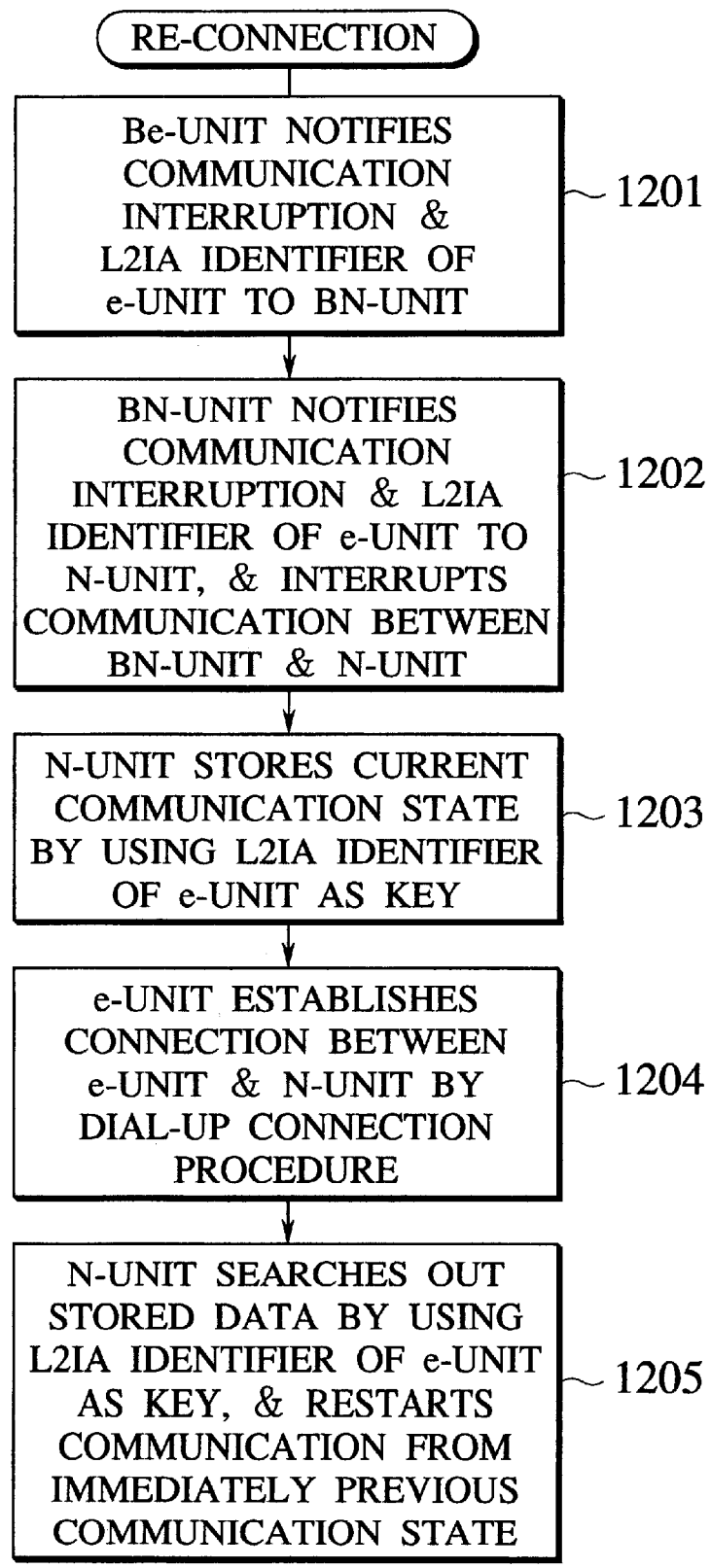
FIG. 12 is a flow chart for an exemplary signaling operation to realize a re-connection in the L2 integrated access system of FIG. 1.

(4) Re-connection:

The re-connection for restarting the communication by originating a call from the user terminal side after the communication medium used for the communication becomes unavailable or after the communication is interrupted upon request from the user is realized according to the flow chart of FIG. 12 as follows.

The Be-unit at which the utilized communication medium is disconnected or the request for interruption is received from the e-unit of the user in a middle of communication notifies the communication interruption and the L2IA identifier of the e-unit to the BN-unit (step 1201).

Upon receiving this notification, the BN-unit notifies the communication interruption and the L2IA identifier of the e-unit to the N-unit, and interrupts the communication between the BN-unit and the N-unit (step 1202).

Upon receiving this notification, the N-unit stores the current communication state by using the L2IA identifier of the connection target e-unit as a key (step 1203). Here, the period of time for storing this data can be determined in advance. The storage time may be set by the user for the user data to which the PPP interface is allocated statically. This data is to be stored only for a limited period of time in the case of using the dynamic connection set up in which the network protocol identifier such as IP address is to be given at every occasion of connection set up.

After the communication is interrupted, the e-unit tries to establish a connection through which the user data are to flow between the e-unit and the N-unit by re-connection using the desired communication medium of the user, according to the dial-up connection procedure described above (step 1204).

When the connection is re-established, the N-unit searches out the stored data by using the L2IA identifier of the connection target e-unit, and when the corresponding stored data is found, the N-unit restarts the communication from the communication state immediately before the interruption (step 1205).

In this manner, when the user restarts the communication, the communication can be restarted from the communication state immediately before the interruption. The stored data is selected according to the L2IA identifier of the connection target so that it becomes possible to restart the communication from the immediately previous state regardless of the communication media to be utilized, not just in the case where the PPP interface is allocated statically but also in the case of using the dynamic connection set up.

Note that the case of originating a call from the network side can be realized by the similar procedure as in the above described case of originating a call from the terminal side. In that case, the user's communication state is stored by using the L2IA identifier of the e-unit as a key. Then, the communication can be restarted by establishing the L2IA-U-plane through which the user data are to flow between the e-unit and the N-unit according to the dial-out connection procedure described above, and calling up the stored data by using the L2IA identifier of the connection target e-unit as a key.

It is to be noted that, when the optional availability information is omitted in the RLD or to be ignored, the signaling operations described above can be modified to simply request the RLD with the highest priority level to the LPR without referring to the availability information.

It is also to be noted that, in the signaling operations described above, the authentication is carried out to check whether a correspondent is a proper correspondent is not, in order to prevent a malicious third person to steal data or alter data. The authentication fails when a correspondent is not a proper correspondent that is authorized to exchange data.

It is also to be noted that communications between different e-units can be realized through the N-unit in the L2 Integrated access scheme of the present invention.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An L2 integrated access system, comprising:

L2IA (L2 Integrated Access) subscribers for supporting communications between user terminals user various communication media, each L2IA subscriber having an L2IA identifier for uniquely identifying each L2IA subscriber within the L2 integrated access system and a terminal ID for uniquely identifying each L2IA subscriber within each communication medium associated with each L2IA subscriber; and an L2IA relay network formed by:

a plurality of relay units to be connected with the L2IA subscribers through various communication media and relaying communications between the L2IA subscribers through the L2IA relay network, each relay unit being provided in correspondence to one communication medium such that at least one relay unit is provided in correspondence to each communication medium, and each relay unit having an L2IA relay ID for uniquely identifying each relay unit within the L2IA relay network and a terminal ID for uniquely identifying each relay unit within each communication medium associated with each relay unit; and at least one LPR (Location and Preference Register) for registering an RLD (Registered Location Data) indicating a terminal ID of an L2IA subscriber and an L2IA relay ID of a relay unit for each potentially available communication medium in correspondence to the L2IA identifier of each L2IA subscriber, such that the relay unit relays the communications between the L2IA subscribers according to the RLDs registered in correspondence to the L2IA identifiers of the L2IA subscribers.

2. The system of claim 1, wherein the L2IA subscribers include an e-type L2IA subscriber having at least one communication interface, one PPP interface and one L2IA interface, and an N-type L2IA subscribers having at least one communication interface, at least one PPP interface, and one L2IA interface, where each communication interface is capable of setting up a connection with a relay unit, each PPP (Point-to-Point Protocol) interface is capable of exchanging PPP packets and PPP related information with a user terminal, and each L2IA interface is capable of selectively interfacing the communication interface and the PPP interface.

3. The system of claim 1, wherein each L2IA subscriber has a function for establishing one or more L2IA-U-planes with respect to one or more other L2IA subscribers, the L2IA-U-plane being a logical connection through which communication data of the user are to flow.

4. The system of claim 1, wherein each relay unit has a function for transmitting and receiving signaling messages with respect to other relay units and the LPR within the L2IA relay network, and a function for establishing an L2IA channel with respect to the L2IA subscriber, the L2IA channel being a logical connection for supporting an L2 integrated access from the L2IA subscriber to the relay unit.

5. The system of claim 1, wherein the RLD registered by the LPR also indicates a priority level of each potentially available communication medium set by a user and an optional current availability of each potentially available communication medium.

6. The system of claim 1, wherein one L2IA subscriber provided at one user terminal associated with one communication medium carries out a dial-up connection to another L2IA subscriber provided at a user's home network associated with another communication medium, by setting up a connection to one relay unit provided in correspondence to said one communication medium which is appropriate for said one L2IA subscriber and specifying the L2IA identifier of said another L2IA subscriber to said one relay unit, such that said one relay unit sets up a connection to another relay unit provided in correspondence to said another communication medium which is appropriate for said another L2IA subscriber according to one RLD registered by the LPR in correspondence to the L2IA identifier of said another L2IA subscriber and said another relay unit sets up a connection to said another L2IA subscriber according to said one RLD.

7. The system of claim 1, wherein one L2IA subscriber provided at a user's home network associated with one communication medium carries out a dial-out connection to another L2IA subscriber provided at one user terminal associated with another communication medium, by setting up a connection to one relay unit provided in correspondence to said one communication medium which is most apparopriate for said one L2IA subscriber and specifying the L2IA identifier of said another L2IA subscriber to said one relay unit, such that said one relay unit sets up a connection to another relay unit provided in correspondence to said another communication medium which is appropriate for said another L2IA subscriber according to one RLD registered by the LPR in correspondence to the L2IA identifier of said another L2IA subscriber and said another relay unit sets up a connection to said another L2IA subscriber according to said one RLD.

8. The system of claim 1, wherein one L2IA subscriber provided at a user terminal which is communication with another L2IA subscriber provided at a user's home network carries out a handover for changing communication media to be used for communication with said another L2IA subscriber from a first communication medium to a second communication medium, by requesting the handover to a first relay unit provided in correspondence to the first communication medium, setting up a connection to a second relay unit provided in correspondence to the second communication medium which is appropriate for said one L2IA subscriber, and specifying the L2IA identifier of said another L2IA subscriber to the second relay unit, such that the second relay unit sets up a connection to a third relay unit provided in correspondence to a communication medium associated with the user's home network which is appropriate for said another L2IA subscriber according to one RLD registered by the LPR in correspondence to the L2IA identifier of said another L2IA subscriber while the first relay unit disconnects a connection between said one L2IA subscriber and the first relay unit as well as a connection between the first relay unit and the third relay unit.

9. The system of claim 1, wherein one L2IA subscriber provided at a user terminal which is communicating with another L2IA subscriber provided at a user's home network carries out a handover for changing communication media to be used for communication with said another L2IA subscriber from a first communication medium to a second communication medium, by requesting the handover to a first relay unit provided in correspondence to the first communication medium, such that the first relay unit obtains one RLD registered by the LPR in correspondence to the L2IA identifier of said one L2IA subscriber, a second relay unit provided in correspondence to the second communication medium which is appropriate for said one L2IA subscriber and which is indicated by said one RLD sets up a connection to said one L2IA subscriber, the first relay unit sets up a connection to the second relay unit so that communication data flows from the first relay unit to said one L2IA subscriber via the second relay unit, the first relay unit notifies the second relay unit to a third relay unit provided in correspondence to a communication medium associated with the user's home network which is appropriate for said another L2IA subscriber so that the third relay unit sets up a connection between the third relay unit and the second relay unit and starts transmitting the communication data to the second relay unit while stops transmitting the communication data to the first relay unit, and the first relay unit disconnects a connection between said one L2IA subscriber and the first relay unit, a connection between the first relay unit and the second relay unit, and a connection between the first relay unit and the third relay unit.

10. The system of claim 1, wherein one L2IA subscriber provided at a user's home network stores a communication state for a communication with another L2IA subscriber provided at a user terminal when said another L2IA subscriber interrupts the communication, and resumes the communication with said another L2IA subscriber from the stored communication state when said another L2IA subscriber carries out a re-connection to said one L2IA subscriber.

11. A method of dial-up connection from one L2IA subscriber provided at one user terminal associated with one communication medium to another L2IA subscriber provided at a user's home network associated with another communication medium in the L2 integrated access system of claim 1, the method comprising the steps of:

(a) setting up a connection from said one L2IA subscriber to one relay unit provided in correspondence to said one communication medium which is appropriate for said one L2IA subscriber;

(b) specifying the L2IA identifier of said another L2IA subscriber from said one L2IA subscriber to said one relay unit;

(c) setting up a connection from said one relay unit to another relay unit provided in correspondence to said another communication medium which is appropriate for said another L2IA subscriber according to one RLD registered by the LPR in correspondence to the L2IA identifier of said another L2IA subscriber specified by the step (b); and (d) setting up a connection from said another relay unit to said another L2IA subscriber according to said one RLD.

12. A method of dial-out connection from one L2IA subscriber provided at a user's home network associated with one communication medium to another L2IA subscriber provided at one user terminal associated with another communication medium in the L2 integrated access system of claim 1, the method comprising the steps of:

(a) setting up a connection from said one L2IA subscriber to one relay unit provided in correspondence to said one communication medium which is appropriate for said one L2IA subscriber;

(b) specifying the L2IA identifier of said another L2IA subscriber from said one L2IA subscriber to said one relay unit;

(c) setting up a connection from said one relay unit to another relay unit provided in correspondence to said another communication medium which is appropriate for said another L2IA subscriber according to one RLD registered by the LPR in correspondence to the L2IA identifier of said another L2IA subscriber specified by the step (b); and (d) setting up a connection from said another relay unit to said another L2IA subscriber according to said one RLD.

13. A method of handover by one L2IA subscriber provided at a user terminal which is communicating with another L2IA subscriber provided at a user's home network, for changing communication media to be used for communication with said another L2IA subscriber from a first communication medium to a second communication medium, in the L2 integrated access system of claim 1, the method comprising the steps of:

(a) requesting the handover from said one L2IA subscriber to a first relay unit provided in correspondence to the first communication medium;

(b) setting up a connection from said one L2IA subscriber to a second relay unit provided in correspondence to the second communication medium which is appropriate for said one L2IA subscriber;

(c) specifying the L2IA identifier of said another L2IA subscriber from said one L2IA subscriber to the second relay unit;

(d) setting up a connection from the second relay unit to a third relay unit provided in correspondence to a communication medium associated with the user's home network which is appropriate for said another L2IA subscriber according to one RLD registered by the LPR in correspondence to the L2IA identifier of said another L2IA subscriber specified by the step (c); and (e) disconnecting a connection between said one L2IA subscriber and the first relay unit as well as a connection between the first relay unit and the third relay unit.

14. A method of handover by one L2IA subscriber provided at a user terminal which is communicating with another L2IA subscriber provided at a user's home network, for changing communication media to be used for communication with said another L2IA subscriber from a first communication medium to a second communication medium, in the L2 integrated access system of claim 1, the method comprising the steps of:

(a) requesting the handover from said one L2IA subscriber to a first relay unit provided in correspondence to the first communication medium;

(b) obtaining one RLD registered by the LPR in correspondence to the L2IA identifier of said one L2IA subscriber at the first relay unit;

(c) setting up a connection to said one L2IA subscriber from a second relay unit provided in correspondence to the second communication medium which is appropriate for said one L2IA subscriber and which is indicated by said one RLD;

(d) setting up a connection from the first relay unit to the second relay unit so that communication data flows from the first relay unit to said one L2IA subscriber via the second relay unit;

(e) notifying the second relay unit from the first relay unit to a third relay unit provided in correspondence to a communication medium associated with the user's home network which is appropriate for said another L2IA subscriber;

(f) setting up a connection between the third relay unit and the second relay unit and start transmitting the communication data from the third relay unit to the second relay unit while stop transmitting the communication data from the third relay unit to the first relay unit; and (g) disconnecting a connection between said one L2IA subscriber and the first relay unit, a connection between the first relay unit and the second relay unit, and a connection between the first relay unit and the third relay unit.

15. A method of re-connection in the L2 integrated access system of claim 1, comprising the steps of:

(a) storing in one L2IA subscriber provided at a user's home network a communication state for a communication with another L2IA subscriber provided at a user terminal when said another L2IA subscriber interrupts the communication; and (b) resuming the communication between said one L2IA subscriber and said another L2IA subscriber from the communication state stored by the step (a), when said another L2IA subscriber carries out a re-connection to said one L2IA subscriber.

* * * * *